(12) United States Patent
Kraft

(10) Patent No.: US 7,895,131 B2
(45) Date of Patent: Feb. 22, 2011

(54) CARGO TRACKING APPARATUS, SYSTEM AND METHOD

(75) Inventor: Randy Allen Kraft, Niagara Falls, NY (US)

(73) Assignee: Tracking Innovations, Inc., Boca Raton, FL (US)

( * ) Notice: Subject to any disclaimer, the term of this patent is extended or adjusted under 35 U.S.C. 154(b) by 470 days.

(21) Appl. No.: 11/969,667

(22) Filed: Jan. 4, 2008

(65) Prior Publication Data

US 2010/0076902 A1 Mar. 25, 2010

(51) Int. Cl.
G06Q 30/00 (2006.01)
G06Q 10/00 (2006.01)
G08G 5/04 (2006.01)

(52) U.S. Cl. .................. 705/333; 705/28; 340/961

(58) Field of Classification Search ............... 705/28, 705/333; 340/961
See application file for complete search history.

(56) References Cited

U.S. PATENT DOCUMENTS

| | | | |
|---|---|---|---|
| 5,815,407 A | 9/1998 | Huffman et al. | |
| 6,208,910 B1 | 3/2001 | Michael et al. | |
| 6,480,108 B2 | 11/2002 | McDonald | |
| 6,975,224 B2 | 12/2005 | Galley, III et al. | |
| 7,136,832 B2 | 11/2006 | Li et al. | |
| 7,248,160 B2 | 7/2007 | Mangan et al. | |
| 7,258,276 B2 | 8/2007 | Linton et al. | |
| 7,260,553 B2 | 8/2007 | Ebert | |
| 7,262,792 B2 | 8/2007 | Shniberg et al. | |
| 7,357,317 B2 | 4/2008 | Baldassari et al. | |
| 7,411,506 B2 | 8/2008 | Volpi et al. | |
| 7,411,921 B2 | 8/2008 | Strong et al. | |
| 7,423,535 B2 | 9/2008 | Chung et al. | |
| 7,432,802 B2 | 10/2008 | Charlot, Jr. et al. | |
| 7,450,024 B2 | 11/2008 | Wildman et al. | |
| 7,454,315 B2 | 11/2008 | Kadaba | |
| 7,460,866 B2 * | 12/2008 | Salkini et al. ............... 455/431 |
| 2002/0104013 A1 | 8/2002 | Ghazarian | |
| 2003/0137968 A1 | 7/2003 | Lareau et al. | |
| 2004/0078151 A1 * | 4/2004 | Aljadeff et al. ............... 702/40 |
| 2004/0127208 A1 | 7/2004 | Nair et al. | |
| 2004/0174260 A1 | 9/2004 | Wagner | |
| 2005/0080566 A1 | 4/2005 | Vock et al. | |
| 2005/0218233 A1 | 10/2005 | Petersen et al. | |
| 2005/0219039 A1 | 10/2005 | Allen | |
| 2005/0222933 A1 * | 10/2005 | Wesby ............... 705/36 |

(Continued)

OTHER PUBLICATIONS

"Proven Wireless Tracking System Ready for the Airlines", Airline Financial News, Potomac: Nov. 3, 2003, vol. 21, Iss. 42; p. 1.*

(Continued)

*Primary Examiner*—Fadey S Jabr
(74) *Attorney, Agent, or Firm*—Barnes & Thornburg LLP

(57) ABSTRACT

A system for tracking a location of at least one item is described. The system includes a tag associated with the at least one item during a shipping journey. The tag detects shipping information, including temperature, humidity, shock, etc. The tag sends the shipping information to a master unit. The master unit also detects certain shipping information. The master unit communicates with a central processor to provide the shipping information to the central processor. The central processor relies on the shipping information to determine one of a condition or a location of the item.

41 Claims, 17 Drawing Sheets

U.S. PATENT DOCUMENTS

| | | |
|---|---|---|
| 2005/0236478 A1 | 10/2005 | St. Clair et al. |
| 2006/0033616 A1 | 2/2006 | Silva et al. |
| 2006/0077041 A1* | 4/2006 | Chan et al. ................. 340/10.4 |
| 2006/0109106 A1 | 5/2006 | Braun |
| 2006/0187026 A1* | 8/2006 | Kochis ................. 340/539.13 |
| 2006/0208087 A1 | 9/2006 | Kressin et al. |
| 2006/0219601 A1 | 10/2006 | Babanats et al. |
| 2007/0000989 A1 | 1/2007 | Kadaba |
| 2007/0038494 A1* | 2/2007 | Kreitzberg et al. ............. 705/8 |
| 2007/0043698 A1 | 2/2007 | Short, III et al. |
| 2007/0118536 A1* | 5/2007 | McIntyre et al. .............. 707/10 |
| 2007/0164863 A1 | 7/2007 | Himberger et al. |
| 2007/0171859 A1 | 7/2007 | Brahmbhatt et al. |
| 2007/0239840 A1 | 10/2007 | Ishikawa |
| 2008/0004994 A1* | 1/2008 | Ainsworth et al. ............ 705/28 |
| 2008/0046258 A1* | 2/2008 | Mechaley ....................... 705/1 |
| 2008/0092068 A1* | 4/2008 | Norring et al. ............... 715/762 |
| 2008/0240062 A1* | 10/2008 | Lynch et al. ................ 370/338 |
| 2010/0090822 A1* | 4/2010 | Benson et al. .............. 340/508 |

OTHER PUBLICATIONS

Notification of Transmittal of the International Search Report and the Written Opinion of the International Searching Authority, or the Declaration for PCT/US2008/076676, Filed Sep. 17, 2008.

Written Opinion of the International Searching Authority for PCT/US2008/076676, Filed Sep. 17, 2008.

* cited by examiner

CARGO TRACKING APPARATUS, SYSTEM AND METHOD

CROSS-REFERENCE(S) TO RELATED APPLICATION(S)

This patent application is a first-filed U.S. Patent Application and does not rely on any other patent application for priority.

FIELD OF THE INVENTION

The invention concerns an apparatus, system, and method for automatically tracking the worldwide location of letters, packages, parcels, cargo, and any other shipped item(s).

DESCRIPTION OF THE RELATED ART

In the prior art, to track the location of a letter, package, or parcel, a shipper relies on bar code scanning at predetermined locations from the shipment origin to the destination. In many cases, the bar code associated with the letter, package, or parcel will be scanned at least four times: (1) at the shipment point, (2) at the shipment airport, (3) at the destination airport, and (4) at the final destination. As should be readily apparent, there may be additional scanning options, such as when the parcel is placed on a truck, removed from a truck, or when it is sorted.

While this system has proven to be effective, there are at least two deficiencies in the prior art. First, the prior art does not permit a user to determine the location of a parcel between instances when the parcel is scanned. Second, the exact location of a parcel in real time cannot be determined.

Moreover, in connection with scanning, misinformation may be generated. Consider the following example. A parcel is scanned at an airport. The shipper concludes that the parcel has been placed on an airplane and that the parcel is in transit to the destination airport. As it turns out, however, the parcel has been placed on the wrong aircraft. This error will not be discovered until the parcel is scanned at its incorrect destination.

As the foregoing makes apparent, the prior art does not offer any means by which the location of a parcel may be determined in real time, among other deficiencies.

SUMMARY OF THE INVENTION

The invention addresses several failings in the prior art by combining interactive hardware and software that provides real time information about the location of a parcel without the need for scanning a barcode or entering information about the parcel into a computer database.

From the standpoint of hardware, the invention includes a tag. In one contemplated embodiment, the tag is an active transmitter and receiver and, as detailed below, may provide a variety of different types of information including information to permit identification of a location of the tag. In this regard, the signal provided by the tag may not include location information, but may be processed by the system to determine the location of the parcel.

In one contemplated embodiment of the invention, the system includes a master unit ("MU") that is associated with one or more tags. As a transmitter and a receiver, the master unit communicates with the tags and a central processor so that the location of the master unit and the associated tags may be determined.

The signal from the master unit may be processed by any of a number of different receivers. Specifically, the invention contemplates reliance on at least three networks to assist in determining the location of a parcel. The three networks that may be used are: (1) a wireless local area network ("WLAN"), commonly referred to as a "WiFi" network, (2) a cellular network, such as a GPRS network, and (3) a satellite communications network. It is contemplated that any one (or more) of these three networks will receive information from the master unit at any given time.

The system of the invention also incorporates a GPS receiver in the master unit so that terrestrial coordinate information may be received by the master unit. The GPS information is used by the central processor to determine the location of the master unit and, thereby, the tags and parcels associated with the master unit.

With respect to location determination, the GPS network is used to provide terrestrial coordinates for the parcel. The cellular network is used for local triangulation within a specific geographic region. The WiFi network is used to determine if the parcel is within the WiFi network and, therefore, will be able to provide a location within a local region (i.e., within 100 feet or so) of the actual location of the master unit, tag(s), and parcel(s).

The system recognizes that more than any one of these three networks may be employed at any given time to provide information about the location of a parcel. The system is designed to use the most cost-effective option of the three, in a particular instance. For example, if the parcel is within a WiFi network, the WiFi location is probably the cheapest network to rely upon for location information. Accordingly, the system will default to a WiFi mode. If outside of a WiFi network, the system will rely on cellular network triangulation. If outside of a cellular network, the system will default to the GPS network.

As a part of the invention, it is contemplated that a single tag may be applied to each parcel or a single tag may be associated with a plurality of parcels. Where a single tag is associated with a plurality of parcels, an additional cost savings is realized. It is expected that a single tag will be associated with a plurality of parcels in instances where groups of parcels are being shipped to the same location. Also, a single tag may be associated with groups of small parcels, such as letters or small boxes, especially in the instance where association of a single tag to the small parcels may not be economically feasible or justifiable.

It is noted that the master unit need not transmit solely information that may be interpreted to determine the location of the package. There are a number of additional types of information that may be provided by the master unit and the tag.

For example, at present, it is not uncommon for a shipper to add a key tag to a parcel that provides some indication of shock, humidity, temperature, etc., with respect to a shipping condition of the parcel during transit.

Currently-used temperature tags, for example, detect if a predetermined temperature is exceeded during transit. The tag provides an indication if the parcel exceeded the temperature by changing color. Similar indicators are used for shock and for humidity.

Rather than relying on a separate key tag to provide information about conditions during transit of the parcel, the transmitting tag associated with the parcel and the master unit associated with a plurality of tags may include one or more sensors that detect one or more of these parameters. The master unit and the tag may then transmit information regarding one or more of these parameters during transit.

In connection with these specialized master units and tags, it is contemplated that temperature, acceleration, shock, and humidity will encompass at least some of the measured parameters. Master units and tags, therefore, in addition to providing location information, will provide one or more of these four additional types of information. Other information types also may be transmitted.

Another aspect of the invention involves a "geofence." A geofence is a virtual fence around a predefined area. For example, at an airport, the geofence may be established around the shipper's area on the tarmac. If the parcel leaves the geofence area, an alarm may be triggered to highlight that the parcel has been removed from a properly-designated area. The geofence may be quite useful, especially in airport, where a pallet containing a number of parcels might be picked up by accident and transported to the wrong airplane.

In connection with the features described above, it is contemplated that information from the master unit and the tags may be provided to software accessible through the Internet. If so, it is contemplated that a shipper will have the ability to track the location of a parcel in real time, thereby determining if the parcel has been routed properly to its destination.

To conserve battery power on the tag, the tag may be programmed to sent a transmission once every 15 minutes or so. Of course, other time periods are also possible. The same parameters may apply to the master unit.

In addition, the master unit may transmit data at different time intervals depending upon the network in which the master unit is operating. For example, at the WiFi level, the master unit may send information more frequently. At this granular level, more frequent information may be a benefit. At the GPS level, however, frequent transmission may not be needed. At the GPS level, one transmission per hour may be sufficient.

Since active transmitters on aircraft are currently prohibited, it is contemplated that the system automatically will deactivate the master unit and the tags after the parcels have been placed onto an aircraft. To track the parcels, if shipped by air, the system will track the aircraft beacon, thereby acquiring location information during transit from one airport to another. Once the aircraft lands at its destination, the master unit and the tags may be reactivated to resume functionality as discussed above.

To deactivate the master unit and the tags on an aircraft, one contemplated embodiment of the invention provides the master unit with an accelerometer. When the master unit senses an acceleration that is consistent with an aircraft take off, the master unit will disable communication with the central processor and the tags. At the same time, the master unit will send signals to the tags to disable transmissions from the tags. Upon sensing a deceleration consistent with an aircraft landing, the master unit will re-enable communication for itself and for the tags.

In connection with aircraft, it is believed that certain transmissions may eventually be permitted within or from an aircraft during flight. Accordingly, the invention also contemplates that the master unit and the tags will continue to function while on board an aircraft.

With respect to the master unit, it is contemplated that the master unit may function in much the same fashion as a CPU-based (a personal computer ("PC")) unit or a personal data assistant ("PDA")).

It is contemplated that the master unit may have up to 100 tags associated with it. The number "100" may be more or less, but is provided merely as an example. The master unit is a communication hub in this embodiment.

The master unit will accompany the freight from the point of origin to the destination. In this embodiment, the tags transmit their respective information to the master unit, and the master unit transmits the data for all of the associated tags and any additional information to the central database.

By relying on a master unit, the tags do not need to produce strong transmission signals. In fact, the signals may be quite "weak" since the maser unit is expected to remain in close proximity to the parcels and the individual tags. In this embodiment, the tags may be simplified, because they do not need to include large capacity batteries.

In yet another contemplated embodiment, an external processor may be provided. The external processor may be a portable unit. For example, the external processor may be a hand-held PDA. The user of the PDA may be able to access the information from the master unit by accessing functions on the PDA. The transfer of information from the master unit to the PDA may be via a wired or a wireless connection. If the connection is wireless, the communication may be via a Bluetooth signal, infrared signal, or other.

With respect to the external processor, it is contemplated that the external processor also may include a barcode scanner. As a result, when the parcel is scanned, the external processor might request information be transmitted from the master unit to the external processor regarding the particular parcel.

Other aspects of the invention will be made apparent from the description that follows and will be appreciated by those skilled in the art.

BRIEF DESCRIPTION OF THE DRAWINGS

The invention is described in connection with the drawings appended hereto, in which.

DETAILED DESCRIPTION OF EMBODIMENT(S) OF THE INVENTION

Various aspects of the invention will now be described. As should be appreciated by those skilled in the art, a discussion of a particular embodiment of the invention should not be understood as a limitation on the scope of the invention. The various embodiments discussed herein are meant to be exemplary. There are numerous equivalents and variations on the embodiments discussed herein that are intended to be encompassed by the invention, as should be appreciated by those skilled in the art.

Before discussing specific details of the invention, a broad introduction is provided.

Figure 1:
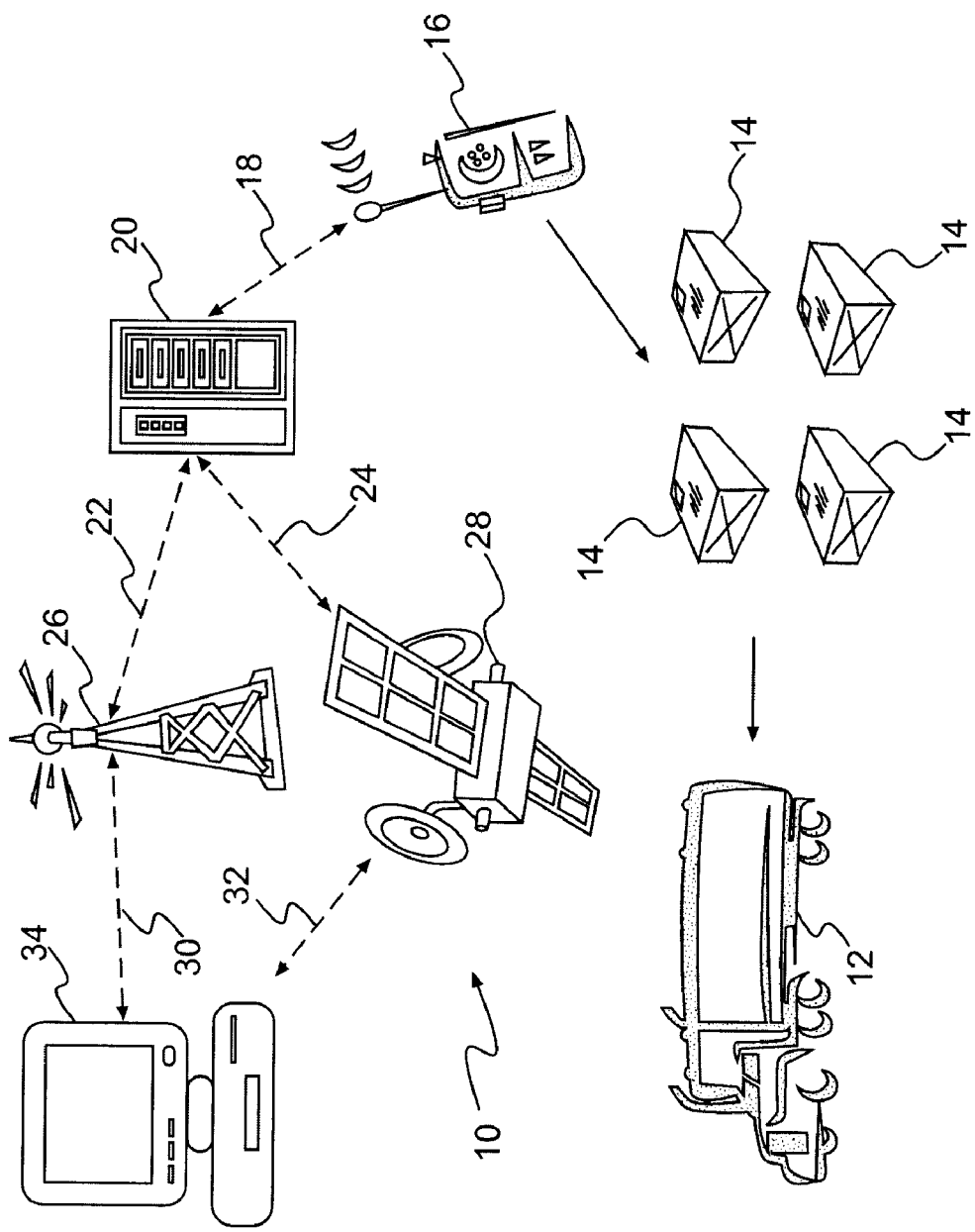
FIG. 1 is a an overview of the tracking system according to the present invention.

The tracking system 10 of the invention is broadly illustrated in FIG. 1. The tracking system includes a transportation vehicle 12. The transportation vehicle 12 may include a truck (as shown), a railway car, an ocean-going ship, an airplane, or any other suitable alternative. While a truck is illustrated in FIG. 1, the invention is not meant to be limited solely to transportation of parcels via highways. As will be made apparent from the discussion herein, international shipping is intended to fall within the scope of the invention. Accordingly, cargo ships and airplanes also are intended to fall within the scope of the term "transportation vehicle" 12. Other transportation vehicles are intended to fall within the scope of this term, although these other transportation vehicles are not specifically enumerated herein.

The transportation vehicle 12 is expected to contain one or more parcels 14. With respect to the use of the term "parcel", this term is intended to broadly encompass any item selected for shipment from a start location to a final location. These items may include, but are not limited to letters, packages, boxes, crates, parcels, shipping containers, pallets, equipment, etc. As used herein, the term "parcel" is intended to encompass any item that is shipped from a point of origin to a destination. While it is expected in most instances that more than one parcel 14 will be placed within one transportation vehicle 12, it is possible that only one parcel 14 may be placed into one transportation vehicle 12, especially in cases where the parcel is a large object. For example, if an industrial bulldozer was to be shipped, it may constitute the only parcel 14 in or on the shipping vehicle 12.

In the illustrated embodiment, a tag 16 is associated with the group of parcels 14. One tag 16 may be affixed to each of the parcels individually or the tag 16 may be associated with a plurality of parcels 14. As is detailed below, the tag 16 is a receiver and transmitter of electromagnetic signals, including radio signals. In one contemplated embodiment, the tag 16 may be a transmitter only, as may be appropriate for a given shipping environment.

The tag 16 transmits and/or receives signals, via a one-way or a two-way communication link 18 to a master unit ("MU") 20. The master unit 20, in turn, transmits and receives signals via one or more communication links 22, 24 to at least one of a tower 26 and/or a satellite 28. The tower 26 and/or the satellite 28, in turn, transmit and receive signals via communication links 30, 32 to a central processor 34. Details concerning each of these components are provided in greater detail below. However, as an overview, the following generalizations are presented.

The tag 16 transmits at least one from several possible signals concerning the parcel or parcels 14 with which the tag 16 is associated. For example, the tag 16 may transmit identifying information about the parcels 14. The identifying information may include content information, point of origin, destination information, and name and contact information for the shipper and the recipient, for example. As may be appreciated by those skilled in the art, the identifying information also may encompass a broad range of additional invoice information that may be applicable for inspection by customs officials. Other identifying information also may be included, and the invention is not intended to be limited to the small number of examples provided herein.

The tag 16 also may include various sensors. For example, the tag 16 may detect specific shipping-related parameters including, but not limited to, humidity, temperature, acceleration rate(s), shocks, and/or other types of information germane to a particular shipping environment. These shipping parameters are broadly referred to as "shipping information" herein. Once detected, the shipping information may be stored by the tag 16 and transmitted to the master unit 20 on a continuous or an intermitted basis. It is contemplated that, to conserve battery power, the shipping information will be transmitted by the tag 16 on an intermittent basis, e.g., every 5 minutes, 10 minutes, 15 minutes, half hour, hour, etc. The tag 16 is contemplated to act as a mini-"flight recorder" during transit of the parcel from the point of origin to the destination. In this way, the tag 16 is contemplated to provide a continuous record of the parcel's journey from start to finish. While the tag 16 will include nonvolatile memory, that memory may not be sufficiently large to save all of the shipping information generated for the parcels 14. As such, the tag 16 is expected to transmit its shipping information to the master unit 20 to clear memory space for additional information during transit. Of course, if the shipment distance is short (and the time associated with the shipment is short), the tag 16 may have sufficient memory space to retain all of the shipping information generated for the parcels 14.

The master unit 20 is contemplated to be local to a group of the tags 16. In the illustrated example, one master unit 20 may be positioned in the transportation vehicle 12. The master unit 20 will then receive transmissions from each of the tags 16 located within the transportation vehicle 12 and transmit shipping information to the central processor 34. As with the tags 16, the master unit 20 may be in continuous communication with the central processor 34 or may be in intermittent contact therewith. As with the tags 16, it is contemplated that intermittent contact will be relied upon to conserve power consumed by the master unit 20. As should be immediately apparent to those skilled in the art, however, the master unit 20 is less likely to be constrained by power limitations because of its placement on the transportation vehicle 12. In this arrangement, the transportation vehicle 12 may supply power to the master unit 20 on a continuous or an intermittent basis to assure proper functioning of the master unit 20. Separately, where the master unit 20 is not provided with an independent power source, it is contemplated that the battery capacity of the master unit 20 will be sufficient for recording shipping information for several days, thereby capturing shipping information for long duration shipping instances.

Since the individual tags 16 are unlikely to be provided with large memory units, the master unit 20 is contemplated to be the repository for information generated by the individual tags 16. In this context, therefore, the master unit 20 is contemplated to act as the "flight recorder" for the plurality of parcels with which it is associated. The master unit 20 will, therefore, receive and store a complete history of the transit conditions for each of the parcels 14 within its monitoring purview.

In an alternative arrangement, it is contemplated that the master unit 20 may be associated with a group of parcels 14 without being positioned within the transportation vehicle 12. In this contemplated embodiment, the master unit 20 may be associated with a pallet of parcels 14 that are placed within the transportation vehicle 12. The master unit 20 will operate in the same fashion as discussed above.

The tower 26, which receives shipping information from and sends signals to the master unit 16, may be any type of electromagnetic signal receiver/transmitter. In one contemplated embodiment, the tower 26 is a terrestrial radio tower or equivalent. In another contemplated embodiment, the tower 26 is a terrestrial microwave tower or equivalent. The type of signal transmission may be analog or digital, as should be appreciated by those skilled in the art. Moreover, the actual type of electromagnetic signals being used is not important to the operation of the invention. To the contrary, the invention is intended to encompass any type of electromagnetic signals. The satellite 28 is contemplated to one in Earth orbit. Like the tower 26, the satellite 28 may receive and transmit any type of electromagnetic signals.

The central processor 34 is contemplated to be positioned at a location where coordination of shipping occurs. Of course, as should be appreciated by those skilled in the art, the central processor 34 may be physically positioned in any suitable location without departing from the scope of the invention. The central processor 34 may be a personal computer, a main frame computer, a personal data assistant, or any other alternative or variation thereof. As may be appreciated by those skilled in the art, the central processor 34 need not be of any particular type. In addition, it is noted that the central processor 34 need not be a single processor but may include a plurality of processors networked together, via wired or wireless communication links.

With respect to the communication links 18, 22, 24, 30, 32, any suitable link may be employed without departing from the scope of the invention. The different types of links may include, but are not limited to, wired or wireless links, radio links, electromagnetic links, cellular network links, global positioning system ("GPS") links, Bluetooth links, personal area network ("PAN") links, WiFi links, local area network links, or any variation(s) thereon. It is contemplated that the tracking system 10 of the invention will operate in the general manner discussed below. Of course, there are an unlimited number of variations that may be employed without departing from the scope of the invention.

With respect to the communication link 18 between the tags 16 and the master unit 20, this link 18 is expected to be of a geographically-limited nature. For example, the tags 16 are not expected to exceed a distance of 100 feet or so from the master unit 20. Accordingly, the tags 16 do not need exceptionally strong transmitters and/or receivers to communicate with the master unit 20. As such, the tags 16 may communicate with the master unit 20 via a suitable local transmission like a WiFi network ("WiFi" is a term used for wireless technology based on IEEE 802.11 standards, which encompass wireless local area networks ("WLANs")), a generic wireless local area network ("WLAN"), a local area network ("LAN"), and/or a Bluetooth connection (or a suitable equivalent). "Bluetooth" is a term understood in the art and is intended to be generic to wireless personal area networks ("PANs") and their equivalents. Signals to and from master units 20 via the communication links 22, 24, on the other hand, are required to traverse much larger distances. As a result, these signals are contemplated to occur over communication lines including cellular networks and satellite networks, or the like. Signals passing from the tower 26 and/or the satellite 28 are contemplated to be made across similar transmission channels.

With respect to the tracking system 10 of the invention, it is contemplated that the master unit 20 may include some of the functionality described above with respect to the tags 16, at least in certain configurations. In the case where the master unit 20 is associated with a group of parcels 14 on a pallet, for example, the master unit 20 may include one or more sensors to detect parameters such as humidity, temperature, acceleration, shock, etc. As such, the tags 16 need not include sensors to detect one or more of the shipping parameters. Alternatively, both the master unit 20 and the tags 16 may include sensors to detect shipping parameters associated with the parcels 14. In such an arrangement, both the master unit 20 and the tags 16 will collect information concerning the shipping parameters, providing redundancy and, therefore, greater reliability in the data.

While it is contemplated that the tracking system 10 of the invention will be employed on a global scale, it is possible that the tracking system 10 may be employed only on a local scale. For example, the tracking system 10 may be employed at a warehouse. In such a case, only tags 16 and master units 20 may be employed without the need for one or more towers 26 and/or satellites 28.

Figure 2:
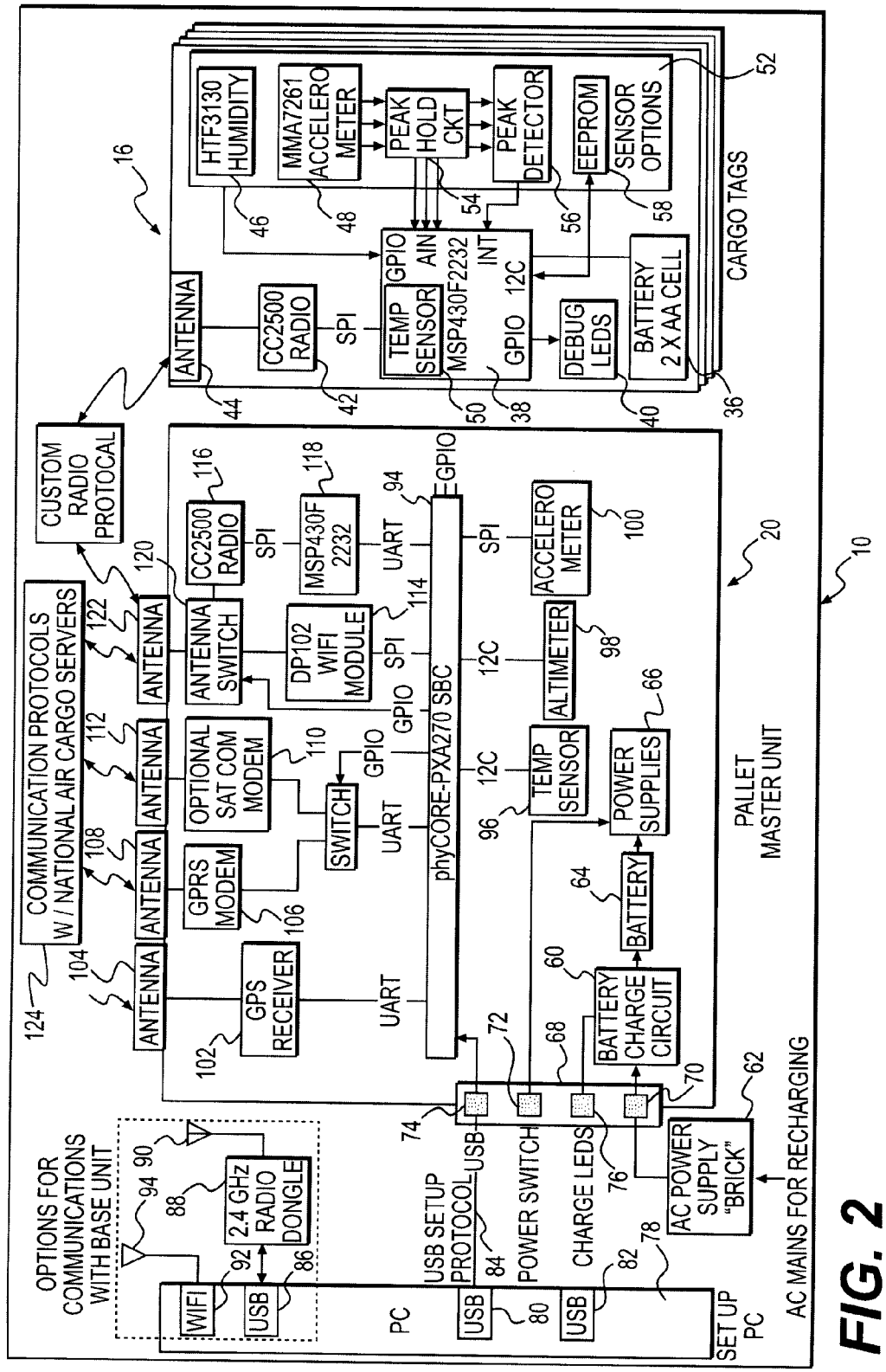
FIG. 2 is a block diagram illustrating three components of the tracking system of the invention illustrated in FIG. 1.

FIG. 2 provides a high-level electrical schematic for the tracking system 10 of the invention. This electrical schematic illustrates features of the master unit 20, an external processor 78, and one tag 16.

With reference to the tag 16, the unit includes a battery compartment 36. While FIG. 2 indicates that the battery compartment may contain 2 "AA"-style batteries, the invention is intended to encompass any other suitable battery arrangements, whether disposable or rechargeable. The battery(ies) supply power to the signal microcontroller 38 and other components.

The microcontroller/processor 38 is connected to debug indicator 40. The debug indicator 40 may include a small display screen or one or more light emitting diodes ("LEDs") that provide an indication of the status of the tag 16. For example, the debug indicator 40 may include several LEDs to display the level of the battery charge. Also, a display or one or more LEDs may be employed to indicate a malfunction or other error. Other indications also may be provided for, as should be appreciated by those skilled in the art.

The microcontroller 38 also is connected to a radio 42, which prepares the data from the processor 38 for transmission to the master unit 20. The radio 42, in turn, is connected to an antenna 44. The antenna 44 may be internal to the tag 16 or may be external, as should be appreciated by those skilled in the art. In the illustrated embodiment, the radio 42 and antenna 44 generate signals at a 2.4 GHz frequency. While this particular frequency is contemplated for the invention, those skilled in the art should appreciate that any other frequency may be employed without departing from the scope of the invention.

One or more sensors may be associated with the microcontroller 38. The sensors may include a humidity sensor 46, an accelerometer 48, and a temperature sensor 50, among others. In FIG. 2, the temperature sensor 50 is illustrated as a part of the processor 38. However, as should be appreciated by those skilled in the art, this arrangement is not required. The temperature sensor 50 may be included as a part of the sensor suite 52.

In FIG. 2, the sensor suite 52 also includes three additional items, a peak hold circuit 54, a shock sensor 56 (also referred to as a peak detector), and an Electrically Erasable Programmable Read-Only Memory ("EEPROM") 58, which is a non-volitile, storage chip used in computers and other devices to store small amounts of volatile data, e.g., calibration tables or device configurations. With the EEPROM, other suitable memory types may be used including, but not limited to a flash memory.

The shock sensor 56 is provided to detect unfavorable impacts experienced by the tag 16. With respect to the peak hold circuit 54, this circuit is intended to retain the peak read by the shock sensor 56 until the microcontroller 38 reads that information.

The master unit 20 includes a battery charge circuit 60. The battery charge circuit 60 is connectable to an external power supply 62. As should be apparent, the external power supply 62 may be connected to the battery charge circuit 60 to charge the battery 64. Alternatively, the master unit 20 may be powered by disposable batteries, as may be required by the tracking system 10. Since the master unit 20 is intended to operate independently of a continuous power source, the power supply 62 is intended to be separable from the master unit 20. The battery provides power to any of a number of electronic components in the master unit 20 including, among them, a power distributor 66. The power distributor 66 may be connected to a input/output circuit 68.

The input/output circuit 68 may include a number of input connectors including a power input port 70 for the external power supply 62. The input/output circuit also may include a manual power switch 72 to provide manual control over the master unit 20. In FIG. 2, the input/output circuit 68 also includes a universal serial bus ("USB") port 74. As may be appreciated by those skilled in the art, more than one USB port 74 may be provided depending on the requirements of the tracking system 10. Also included in the input/output circuit 68 is a power indicator 76. The power indicator 76 may include a display or a series of LEDs that indicate the current status of the power level of the battery (or batteries) 64 in the master unit 20.

The USB port 74 may be provided to interface with an external processor 78. The external processor 78 may be a personal computer, a personal data assistant ("PDA") or other suitable alternative, whether portable or not. As illustrated in FIG. 2, the external processor 78 includes two USB ports 80, 82. In the illustrated example, the USB port 80 is connected to the USB port 74 to permit the external processor 78 to communicate directly with the master unit 20 via a wired communication link 84. This communication link 84 may be used to supply data to the master unit 20 or retrieve data from the master unit 20, as necessary. In addition, the communication link 84 may be used to program the master unit 20 with information specific to a particular shipment.

The external processor 78 also includes components to communicate wirelessly with the central processor 34, the master unit 20, or other devices including the tags 16. As shown, the external processor may include a USB port 86 into which a radio dongle 88 is inserted. The radio dongle 88 includes an antenna 90 for wireless communication. The external processor 78 also includes a WiFi port 92 to which a WiFi antenna 94 is connected. As may be appreciated by those skilled in the art, the WiFi antenna 94 and the radio antenna 90 may be incorporated alternatively into the external processor 78 without departing from the scope of the invention.

While not illustrated, the external processor 78 also may include a barcode scanner. If included, the barcode scanner may read one or more barcodes on the parcels 14 in conjunction with communicating with the master unit 20. In addition, the external processor 78 may be configured to communicate with one or more of the tags 16.

Returning to the discussion of the master unit 20, the master unit 20 also includes a single board computer ("SBC") 94, which controls and coordinates the operation of the master unit 20. While an SBC may be employed for the master unit 20, other variations and equivalents may be employed without departing from the scope of the invention. Several components may be associated with the SBC 94. In connection with FIGS. 12-14, three contemplated arrangements for the master unit 20 are discussed. The arrangement illustrated in FIG. 2 is but one of the contemplated variations for the master unit 20.

As discussed above, the master unit 20 may include one or more sensors to detect shipping parameters and generate data associated therewith. In the illustrated embodiment, the master unit 20 includes a temperature sensor 96, an altimeter 98, and an accelerometer 100. These may be the same types of sensors included in the tags 16 or they may differ from the sensors included in the tags 16. Data generated by the sensors is stored for transmission by the master unit 20. As may be appreciated by those skilled in the art, an altimeter may be included only in those master units 20 that are adapted for use on aircraft. If the master unit 20 is to be used only for parcels 14 being shipped via ground transportation, an altimeter 98 may be excluded without departing from the scope of the invention. It is noted that an altimeter 98 may not be used when the parcels 14 are placed in a pressurized cargo hold of an aircraft, as should be appreciated by those skilled in the art.

The master unit 20 in FIG. 2 also includes a GPS receiver 102 connected to an antenna 104. Accordingly, GPS information may be received and stored by the master unit 20. As should be appreciated by those skilled in the art, the GPS receiver 102 only receives GPS data. Information wirelessly transmitted by the master unit 20 may be routed via one of several different routes within the master unit 20.

As shown in FIG. 2, the master unit 20 includes a general packet radio service ("GPRS") modem 106, connected to an antenna 108, and a satellite communication modem 110 connected to an antenna 112. A switch 114 is provided so that the SBC may select between the GPRS modem 106 and the satellite communication modem 110 depending on the communication link required for a particular shipping environment. When the master unit 20 is located within a cellular network, for example, the master unit 20 will access the GPRS modem 106. When the master unit 20 is outside of a cellular network, the master unit 20 will access the satellite communication modem 110. Alternatively, the master unit 20 will access either one of the modems 106, 110 if communication strength with one of the communication networks is stronger than the other.

It is noted that a GPRS modem 106 is but one of several different modems that may be selected for use with the invention. Other systems relying on CDMA, TDMA, UMTS, EDGE, 3G, and 4G formats, etc., may also be employed without departing from the scope of the invention. Moreover, the GPRS modem 106 may incorporate functionality to interface with the local cellular network regardless of the data transmission format.

As also shown in FIG. 2, the master unit 20 includes a WiFi module 114, a radio 116, a mixed signal controller 118, an antenna switch 120, and an antenna 122. The WiFi module 114 permits communication with a local WiFi network as opposed to a GPRS network or a satellite communications network. The radio 116 and the mixed signal controller 118 permit communication between the master unit 20 and one or more of the tags 16. It is noted that the radio 116 and the mixed signal controller 118 are the same as the radio 42 and the mixed signal controller 38 in the tag 16 that is illustrated in FIG. 2. Of course, the components need not be the same to practice the invention. The switch 120 permits access to the antenna 122 by either the WiFi module 114 or the radio 116, as may be required for operation of the master unit 20.

Antennas 108, 112, and 122 are provided in the master unit 20 to communicate with the central processor 34 via one or more communication protocols 124.

Figure 3:
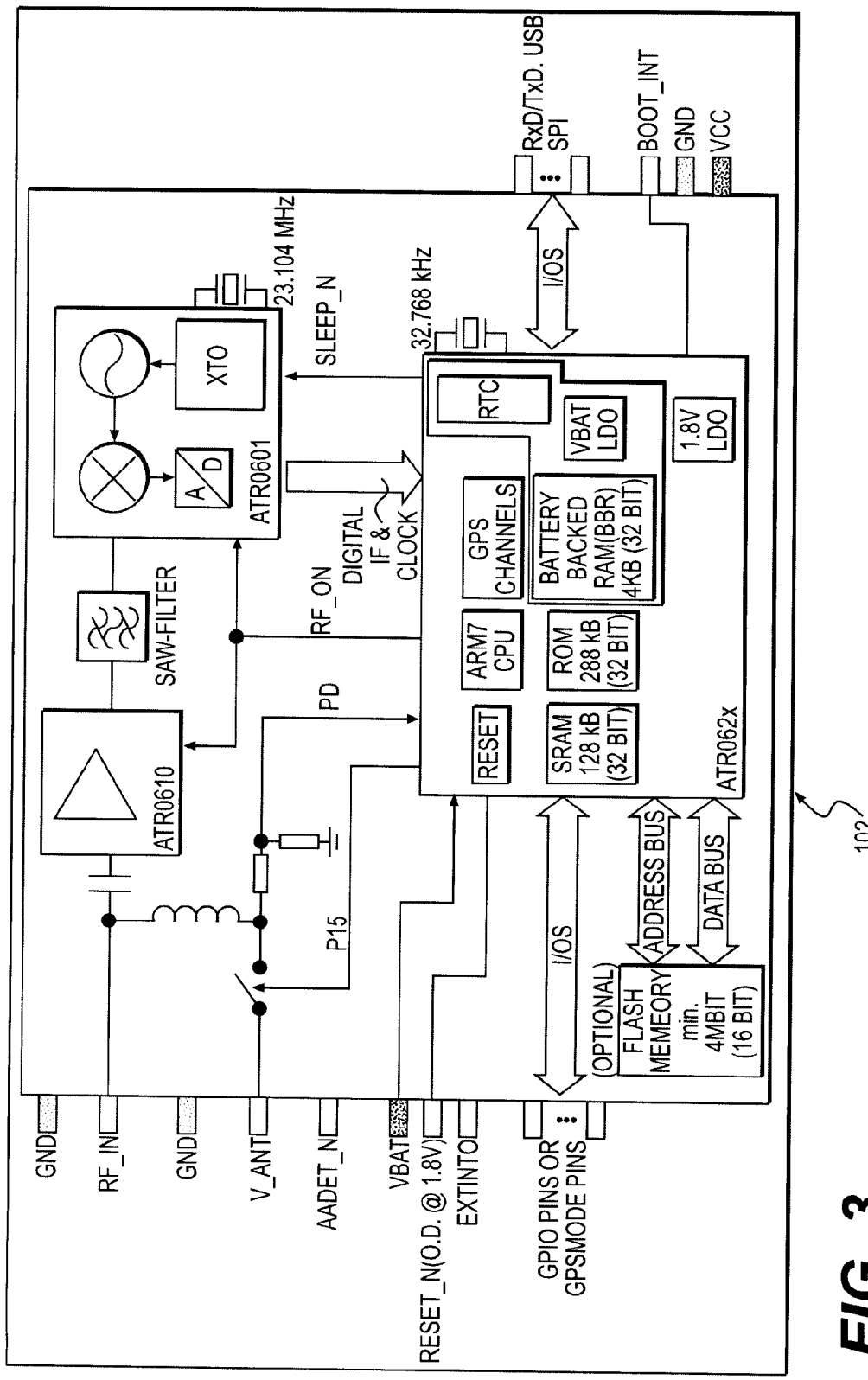
FIG. 3 is a block diagram of one embodiment of a GPS receiver contemplated for incorporation into the master unit that forms a part of the tracking system of the invention.

FIG. 3 is a block diagram of the GPS receiver 102 that is illustrated in FIG. 2. The GPS receiver 102 that is illustrated is commercially available from u-blox (u-blox America, Inc., 1902 Campus Commons Drive, Suite 310, Reston, Va. 20191, USA) under the identifying number LEA-4H. It should be noted that this particular GPS receiver 102 is not required to practice the invention. This is but one possible embodiment contemplated for use with the invention. Since the circuitry of the GPS receiver 102 is not important to the tracking system 10 of the invention, a discussion is not presented here. With respect to the GPS receiver 102, it is contemplated that the GPS receiver 102 will be sensitive enough to pick up even a weak GPS signal (i.e., −155 dBm), thereby assuring capture of location information even in remote locations.

Figure 4:
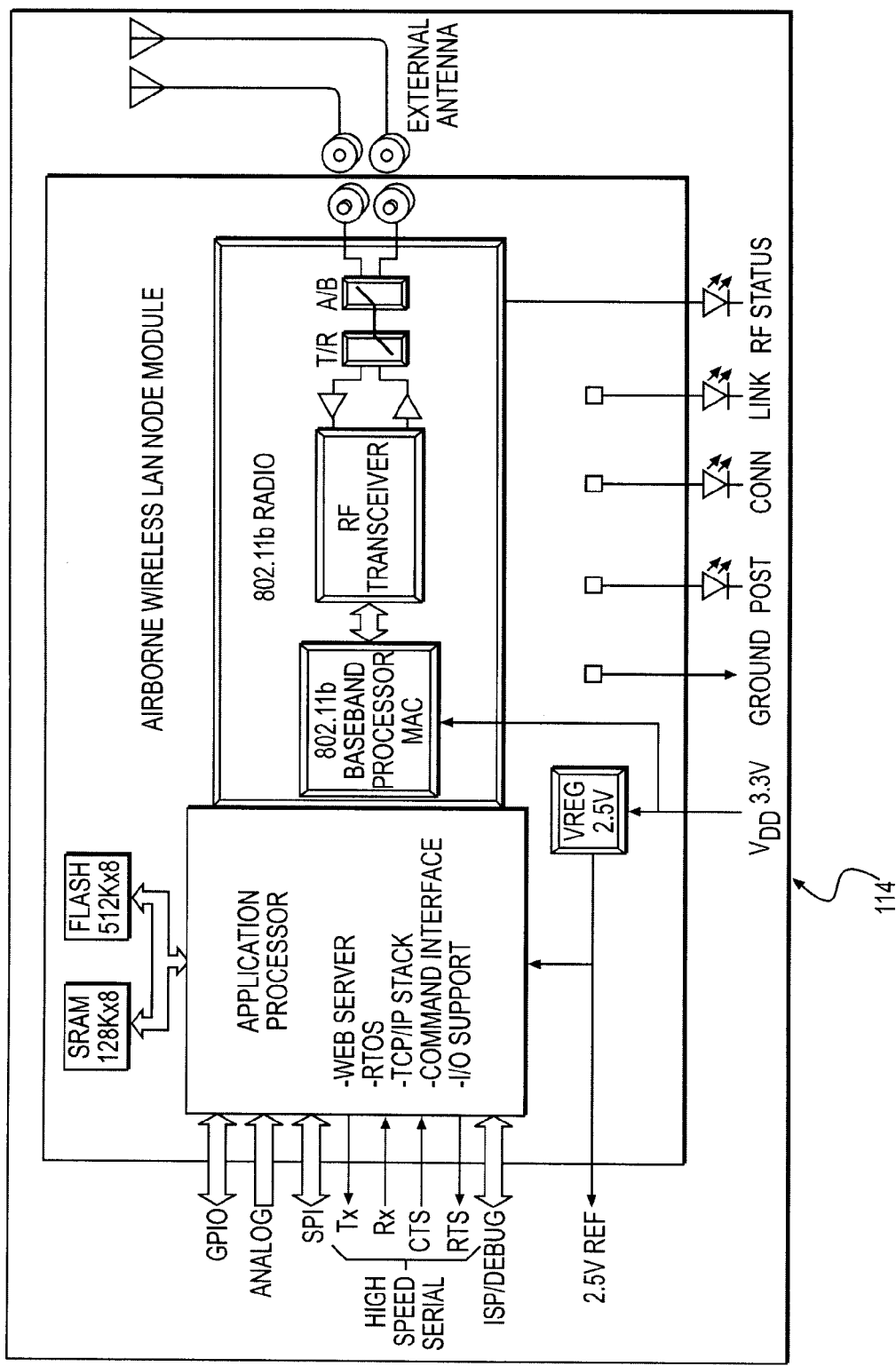
FIG. 4 is a block diagram of one embodiment of a WiFi module contemplated for incorporation into the master unit that forms a part of the tracking system of the invention.

FIG. 4 is a block diagram for the WiFi module 114. The illustrated WiFi module 114 is commercially available from DPAC (Quatech, Inc., A DPAC Technologies Company, 5675 Hudson Industrial Parkway, Hudson, Ohio 44236, USA) under the identifying number WLNB-AN-DP102. It should be noted that this particular WiFi module 114 is not required to practice the invention as any alternative may be employed without departing from the scope of the invention. The illustration of this particular model for the WiFi module 114 is intended to be exemplary only. Since the circuitry of the WiFi module 114 is not important to the operation of the invention, it is not discussed herein.

It is contemplated that the master unit 20 will communicate with a wireless LAN when the master unit 20 is within range of the wireless LAN. Since the invention is intended for international use, the WiFi module 114 should be selected to comply with international standards. Of course, master units 20 for local shipping environments (i.e., the United States only) are also contemplated and are intended to fall within the scope of the invention.

While a block diagram is not provided, the satellite communication module 110 may be selected from any one of a number of different, commercially-available products. In one contemplated embodiment, the master unit 10 may incorporate the 9601 SBD model available from Iridium Satellite LLC, 6707 Democracy Boulevard, Suite 300, Bethesda, Md. 20817, USA. Of course, this particular model is not required to practice the invention, as should be apparent to those skilled in the art.

The master unit 20 will communicate via the satellite communication module 110 when the master unit 20 is within range of a satellite network. As will be discussed in greater detail below, the master unit 20 will communicate with the satellite network when either the GPRS network or the wireless LAN is not available. For shipping purposes, the master unit 20 will not interface with any of the satellite network, the GPRS network, or the wireless LAN when the master unit 20 is placed on board an aircraft. At present, wireless communications on board aircraft are not permitted. Should these regulations change, however, the master unit 20 may remain active during flight. Separately, where real time information is desired for tracking parcels 14 in flight, the tracking system 10 of the invention may be designed to access the flight beacon for the aircraft and to track the location of the aircraft, rather than the mater unit 20.

Figure 5:
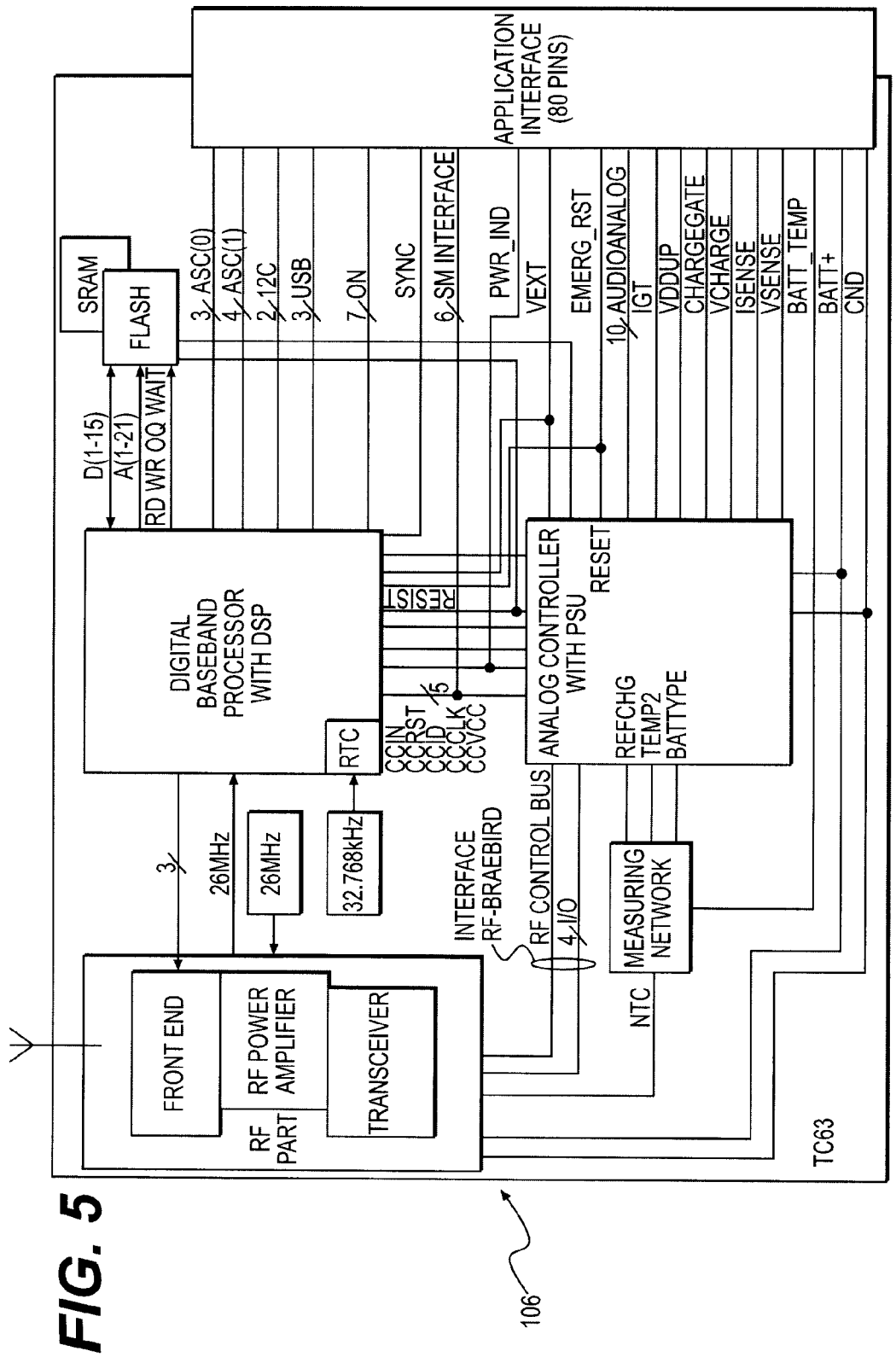
FIG. 5 is a block diagram of one embodiment of a GPRS modem contemplated for incorporation into the master unit that forms a part of the tracking system of the invention.

FIG. 5 is a block diagram of the GPRS modem 106 shown in FIG. 2. The block diagram provided in FIG. 5 is specifically for a product made by Siemens (Siemens AG, Wittelsbacherplatz 2, D-80333 Munich, Germany) under the product identifier TC63. As with others of the components discussed herein, this particular model for the GPRS modem 106 is merely exemplary. It is not required to practice the invention and any of a number of other suitable alternatives may be employed without departing from the scope of the invention. As a result, the specific details of the circuitry provided in FIG. 5 are not discussed herein.

The GPRS modem 106 is intended to communicate via a GPRS cellular to wireless network at least with quadband capability. As noted above, the GPRS modem 106 may include functionality to interface with other networks. Moreover, equivalents to the GPRS modem 106 may be used without departing from the scope of the invention.

Figure 6:
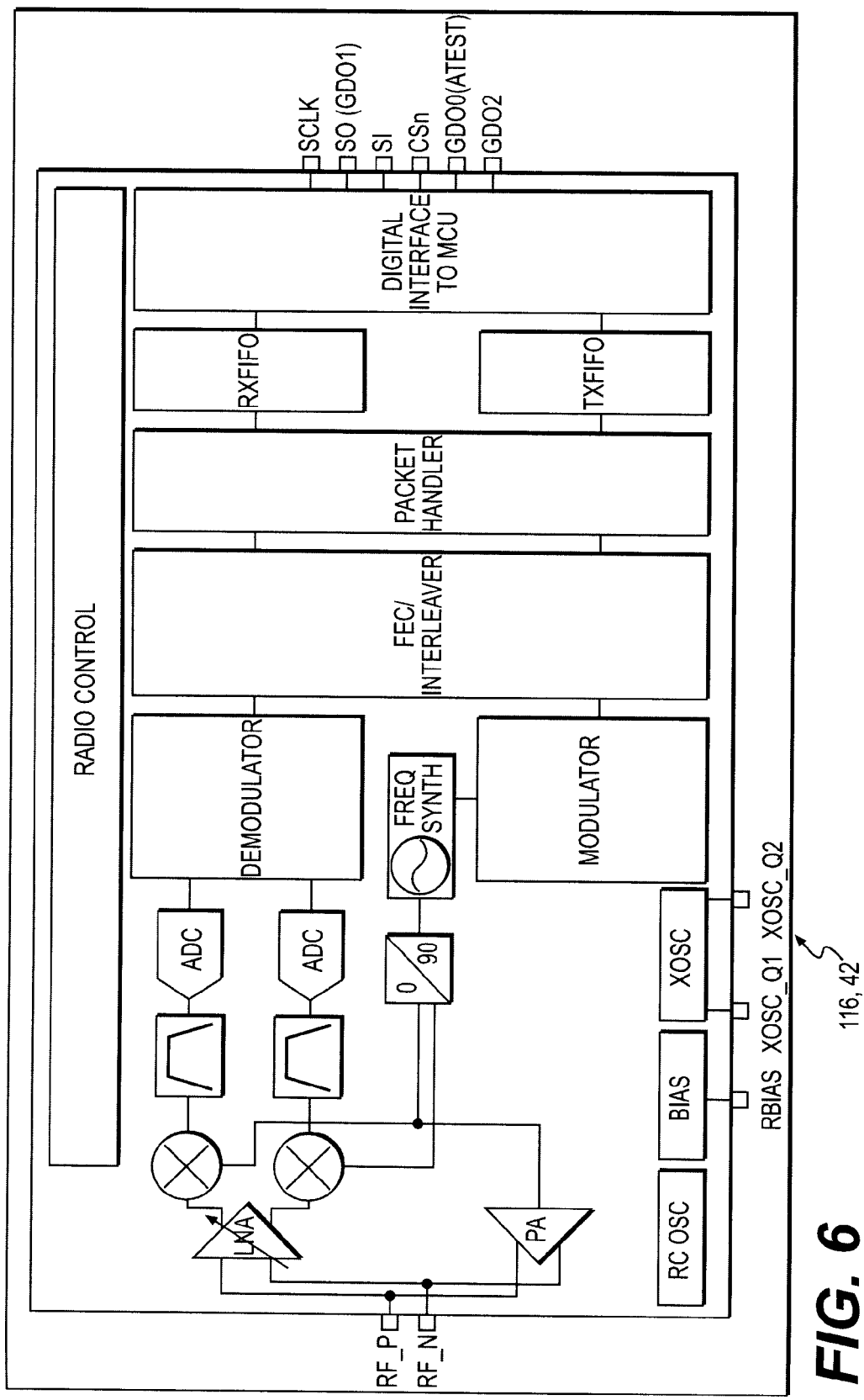
FIG. 6 is a block diagram of one embodiment of a radio contemplated for incorporation into the master unit and the tag that form parts of the tracking system of the invention.

FIG. 6 is a block diagram of the radio module 42, 116. This particular block diagram presents a circuit overview for a radio available from Texas Instruments (Texas Instruments, 12500 TI Boulevard, Dallas, Tex. 75243, USA) under the product code CC2500. This particular model of radio is not required to practice the invention but is merely presented as one contemplated embodiment for the invention. Since the details of the circuitry are not required to practice the invention, details are not discussed herein. As should be apparent to those skilled in the art, any other radio may be employed without departing from the scope of the invention.

The radio module 42, 116 in the illustrated embodiment is a 2.4 GHz radio that permits communication between the master unit 20 and the tags 16. In one contemplated embodiment, the radio module 42, 116 will operate one four separate frequencies so that if a link is lost between one of the tags 16 and the master unit 20, the wireless link may be reestablished via another of the frequencies available to the tag 16 and the master unit 20.

In connection with this aspect of the invention, the master unit 20 and the tag 16 are contemplated to include functionality so that if communication between a master unit 20 and a tag 16 is lost, the master unit 20 will generate an alarm. This function may be used to generate a "geofence" in association with the master unit 20. Specifically, the master unit 20 will keep track of the tags 16 that are within the transmission distance of the radio module 116. If a tag 16 is removed from the transmission area associated with the master unit 20, the master unit 20 will trigger an alarm. In this arrangement, the master unit 20 is used to prevent parcels 14 from being moved to an incorrect transportation vehicle 12, for example. In this arrangement, the master unit 20 also may prevent theft of parcels 14, as may be appreciated by those skilled in the art.

Figure 7:
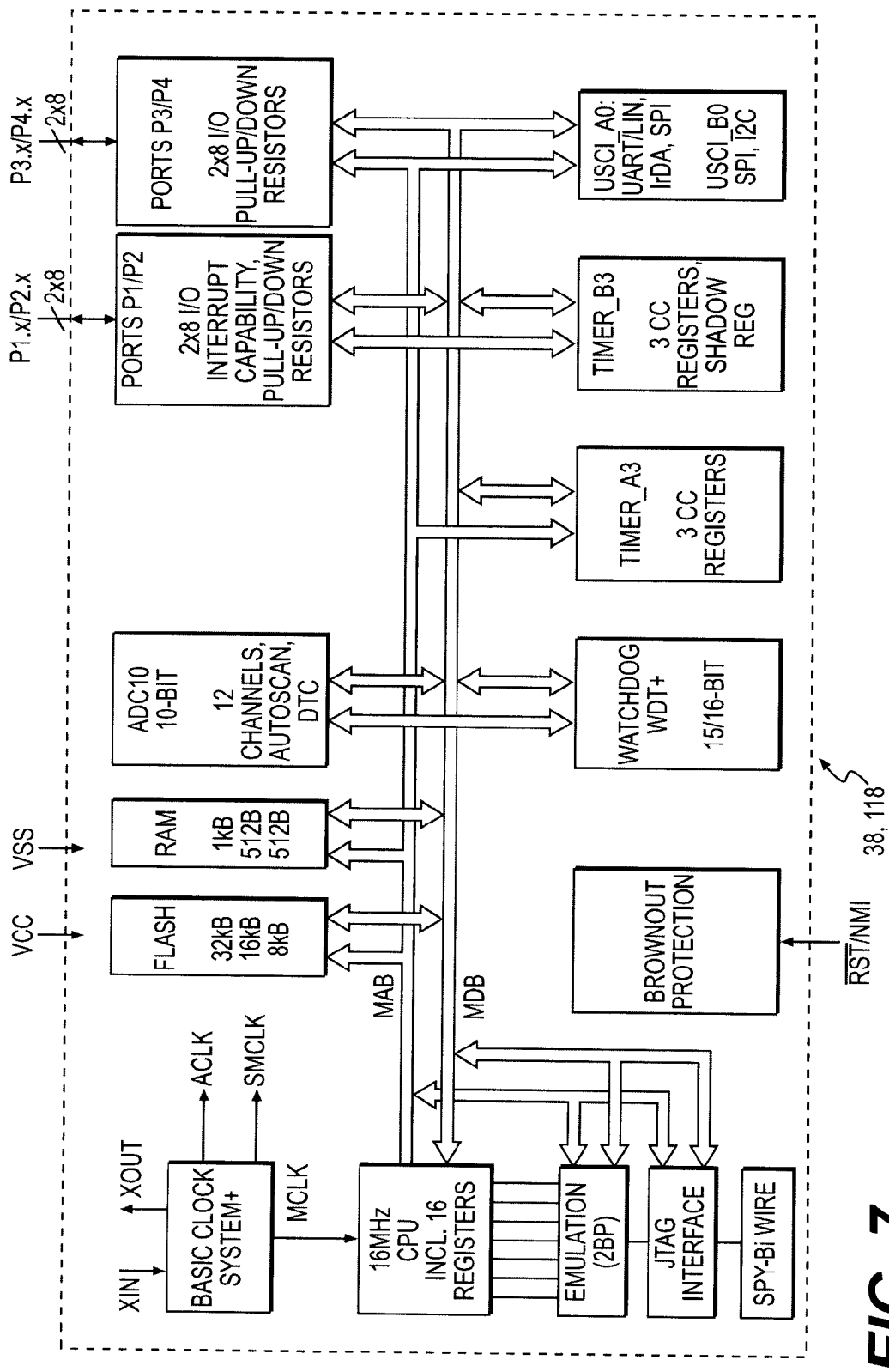
FIG. 7 is a block diagram of one embodiment of a signal microcontroller contemplated for incorporation into the master unit and the tag that form parts of the tracking system of the invention.

FIG. 7 is a block diagram of the radio microcontroller 38, 118 illustrated in FIG. 2. This particular radio microcontroller 38, 118 is commercially available from Texas Instruments under the product identifier MSP430F2232, as indicated in the drawing. This particular microcontroller is not required to practice the invention but is presented merely as one contemplated embodiment. As such, the specifics of the circuitry are note discussed herein. Moreover, as should be clear, other microcontrollers may be employed without departing from the scope of the invention.

The microcontroller 118 provides an interface between the SBC 94 and the radio module 116 in the master unit 20. The microcontroller 38 also provides an interface with the radio module 42 in the tag 16. The microcontroller 38, 118 provides an algorithm to control the 2.4 GHz radio module 42, 116 so that the master unit 20 and the tag 16 may communicate periodically with one another.

Figure 8:
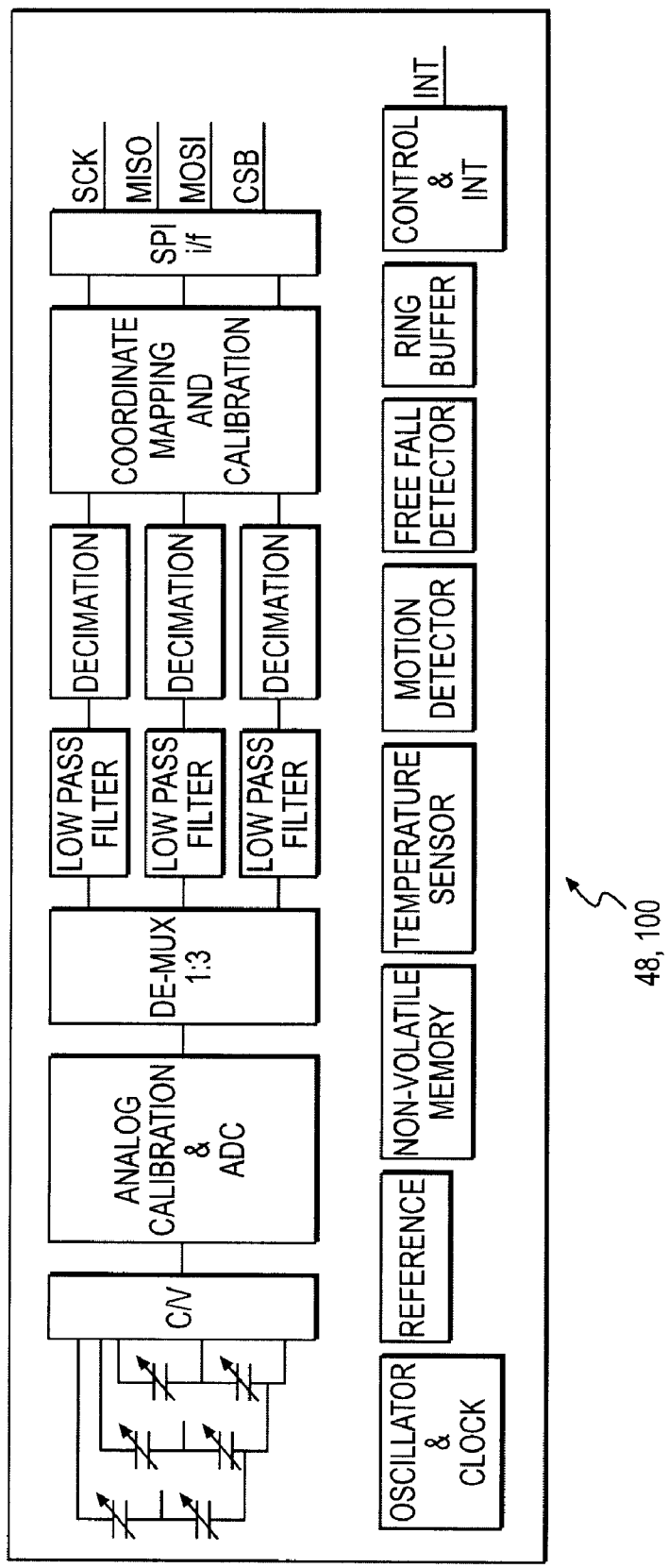
FIG. 8 is a block diagram of one embodiment of an accelerometer contemplated for incorporation into the master unit and the tag that form parts of the tracking system of the invention.

FIG. 8 is a block diagram of an accelerometer 48, 100 contemplated for use with the master unit 20 and the tag 16. FIG. 8 is a block diagram of an accelerometer available from VTI Technologies (VTI Technologies Oy, Myllynkivenkuja 6, 01620 Vantaa, Finland) under the product code SCA3000-D01. This particular accelerometer is detailed to illustrate one contemplated embodiment of the invention and is, therefore, not meant to be limiting of the invention. Since the illustrated accelerometer 48, 100 is exemplary only, a detailed discussion of the circuit diagram is omitted. Those skilled in the art should readily recognize that any of a number of different accelerometers may be employed without departing from the scope of the invention.

The accelerometer 48, 100 is contemplated to detect acceleration of the master unit 20 and the tag 16. Acceleration measurements may be made during takeoff and landing of an aircraft, for example. The accelerometer 48, 100 may detect acceleration in three dimensions. The accelerometer 48, 100 is expected to interface with the master unit 20. Upon detecting a takeoff, the master unit 20 will cease transmission functions until a landing deceleration is detected. Once the landing deceleration is detected, the master unit 20 will resume it normal function. In connection with this function, the master unit 20 will disable and enable transmissions to and from the tags 16 during flight. In this way, the master unit 20 and the tags 16 will not transmit signals while in flight, thereby complying with applicable flight regulations.

Figure 9:
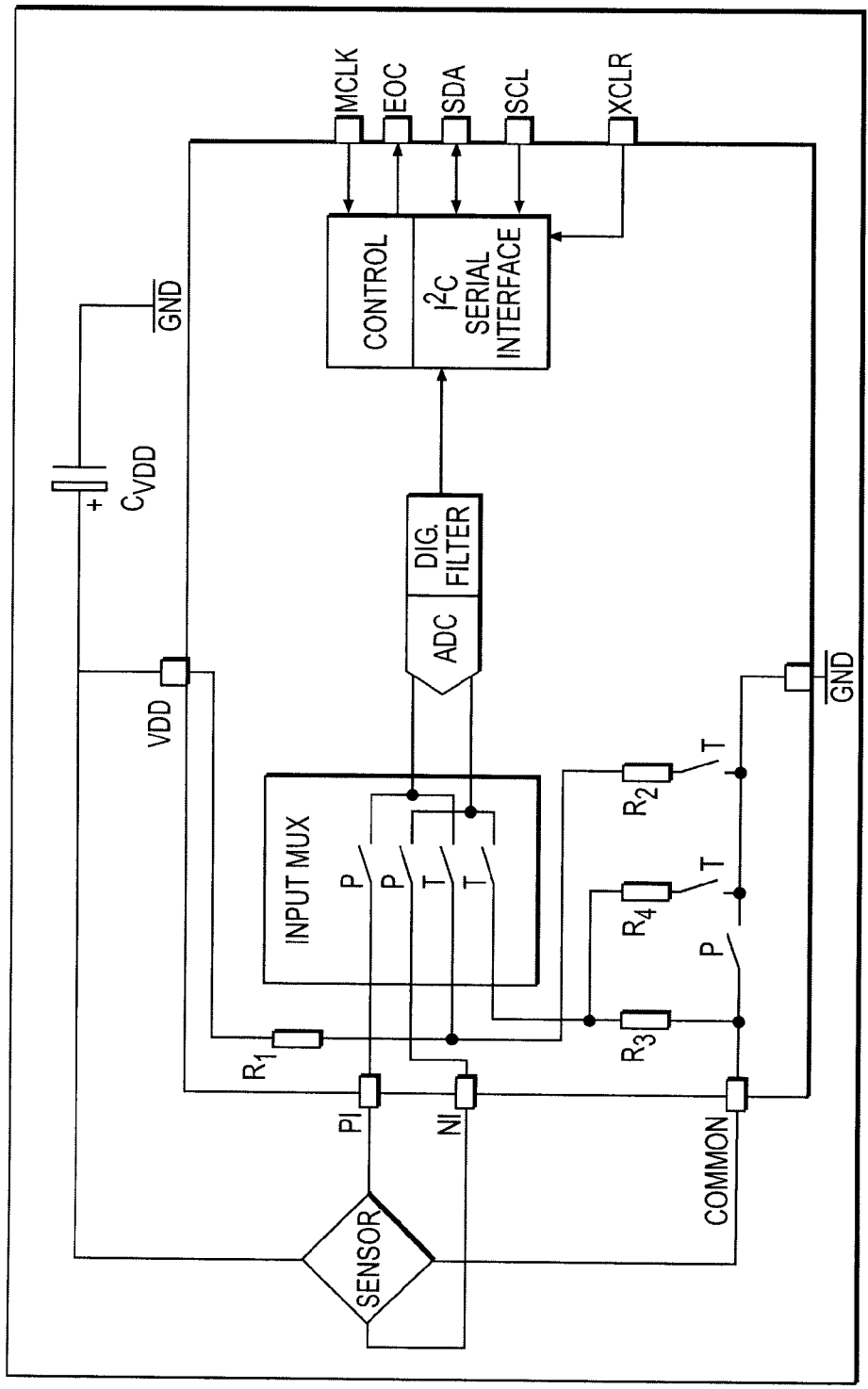
FIG. 9 is a block diagram of one embodiment of an altimeter contemplated for incorporation into the master unit that forms a part of the tracking system of the invention.

FIG. 9 is a block diagram of one altimeter 98 contemplated for use with the master unit 20. The altimeter 98 diagrammed is commercially from Hope Microelectronics (a.k.a., HopeRF Microelectronics) (Hope Microelectronics Co., Ltd, also doing business as Shenzhen Huiyee Hope Electronics Co., Ltd, Rm. T2-8B, Emperor Regency Bldg., 6012 ShenNan Rd., Futian, ShenZhen, GuangDong 518034, China). The altimeter 98 shown is merely exemplary of one commercially-available altimeter 98 that is contemplated for incorporation into the master unit 20 of the invention. Since the exact details of the altimeter 98 are not required to practice the invention, an exhaustive description of the altimeter 98 is not provided herein. As should be apparent to those skilled in the art, any suitable alternative altimeter 98 may be employed without departing from the scope of the invention.

Figure 10:
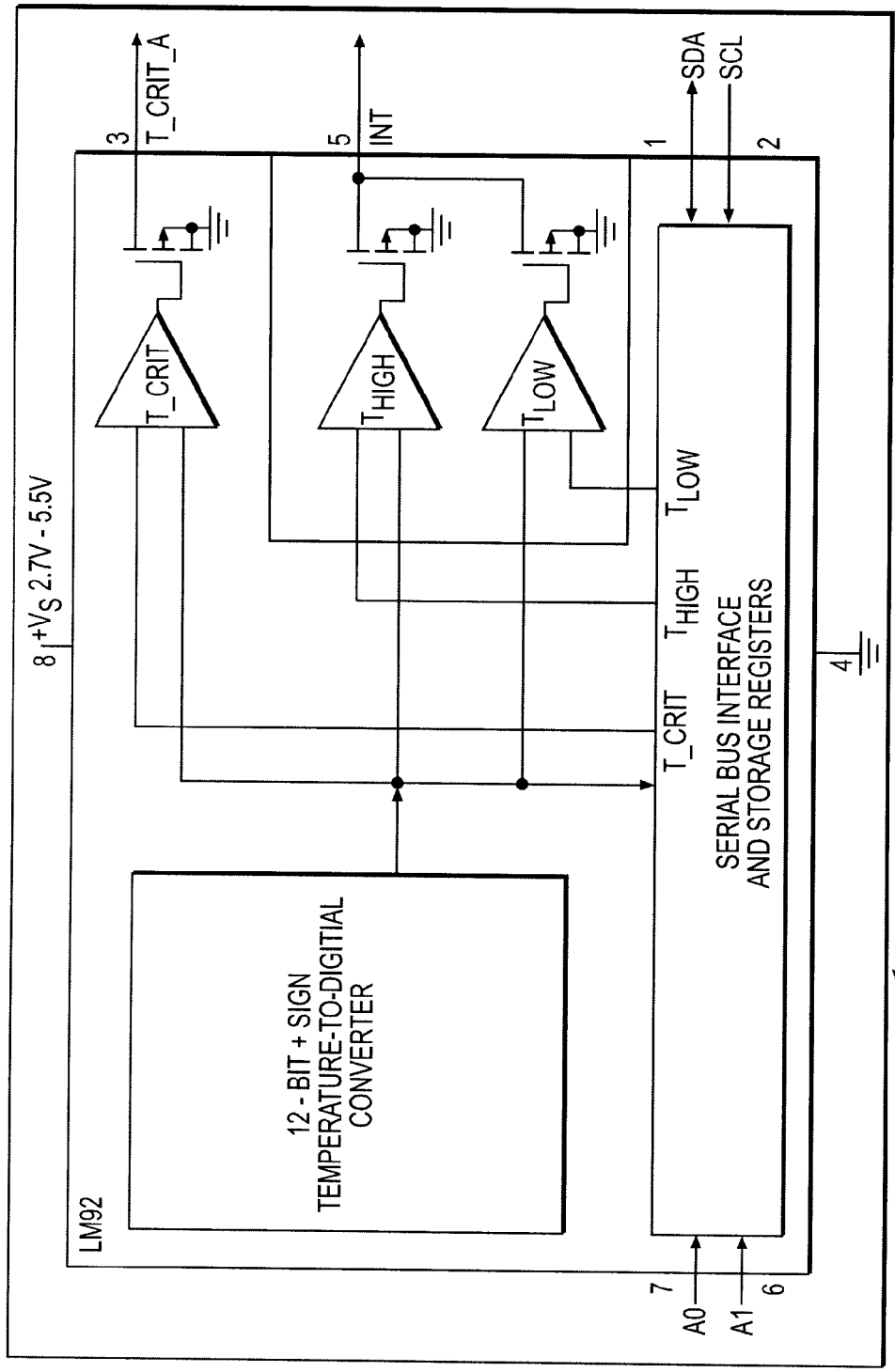
FIG. 10 is a block diagram of one embodiment of a temperature sensor contemplated for incorporation into the master unit and the tag that form a part of the tracking system of the invention.

FIG. 10 presents one contemplated embodiment for the temperature sensor 50, 96 incorporated into the tag 16 or the master unit 20. The circuit diagram provided is for a temperature sensor 50, 96 that is commercially available from National Semiconductor Corporation (2900 Semiconductor Dr., P.O. Box 58090, Santa Clara, Calif. 95052-8090, USA) under the product descriptor code LM92. Since the exact details of the temperature sensor 50, 96 are unimportant to the operation of the tag 16 or the master unit 20, further discussion of the diagram is not made herein. As should be apparent to those skilled in the art, any other temperature sensor 50, 96 may be employed without departing from the scope of the invention.

Figure 11:
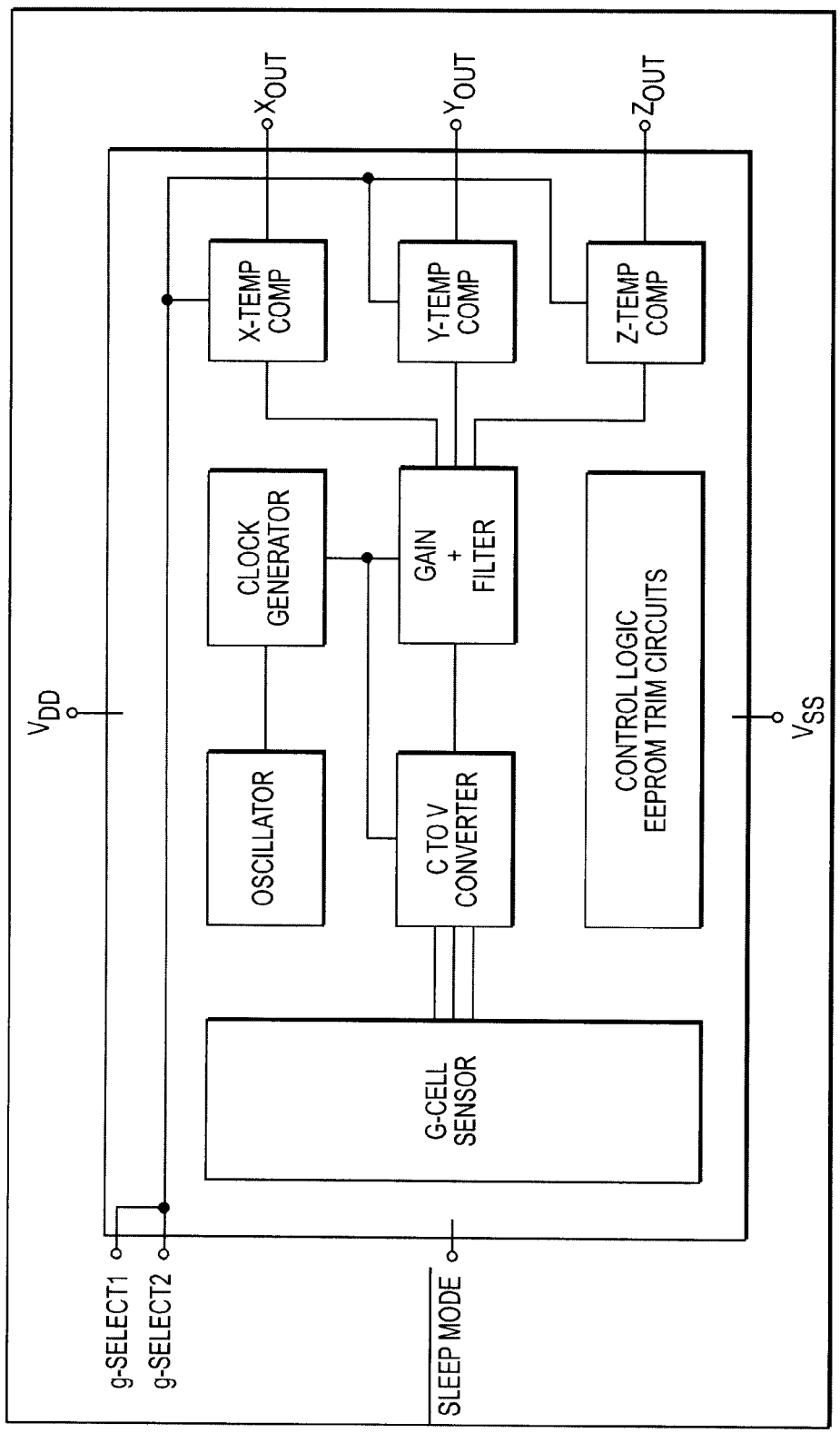
FIG. 11 is a block diagram of one embodiment of a shock sensor contemplated for incorporation into the tag that forms a part of the tracking system of the invention.

FIG. 11 is a block diagram of a shock sensor 56 contemplated for use with the tag 16. The shock sensor 56 is commercially available from Freescale Semiconductor, Inc. (Freescale Semiconductor, Inc., 6501 W William Cannon Dr, Austin, Tex. 78735-8523, USA) under the product code MMA7261QT. This particular shock sensor is not required to practice the present invention. Accordingly, a detailed discussion of the specifics of the components is not included in this discussion. As noted with respect to others of the components provided as examples, this particular shock sensor 56 is not required to practice the present invention. The shock sensor 56 detects shocks experienced during transit, thereby permitting evaluation if the parcels 14 have been dropped, for example, during transit. There are numerous equivalents and variations that may be employed in its stead without departing from the scope of the invention.

Figure 12:
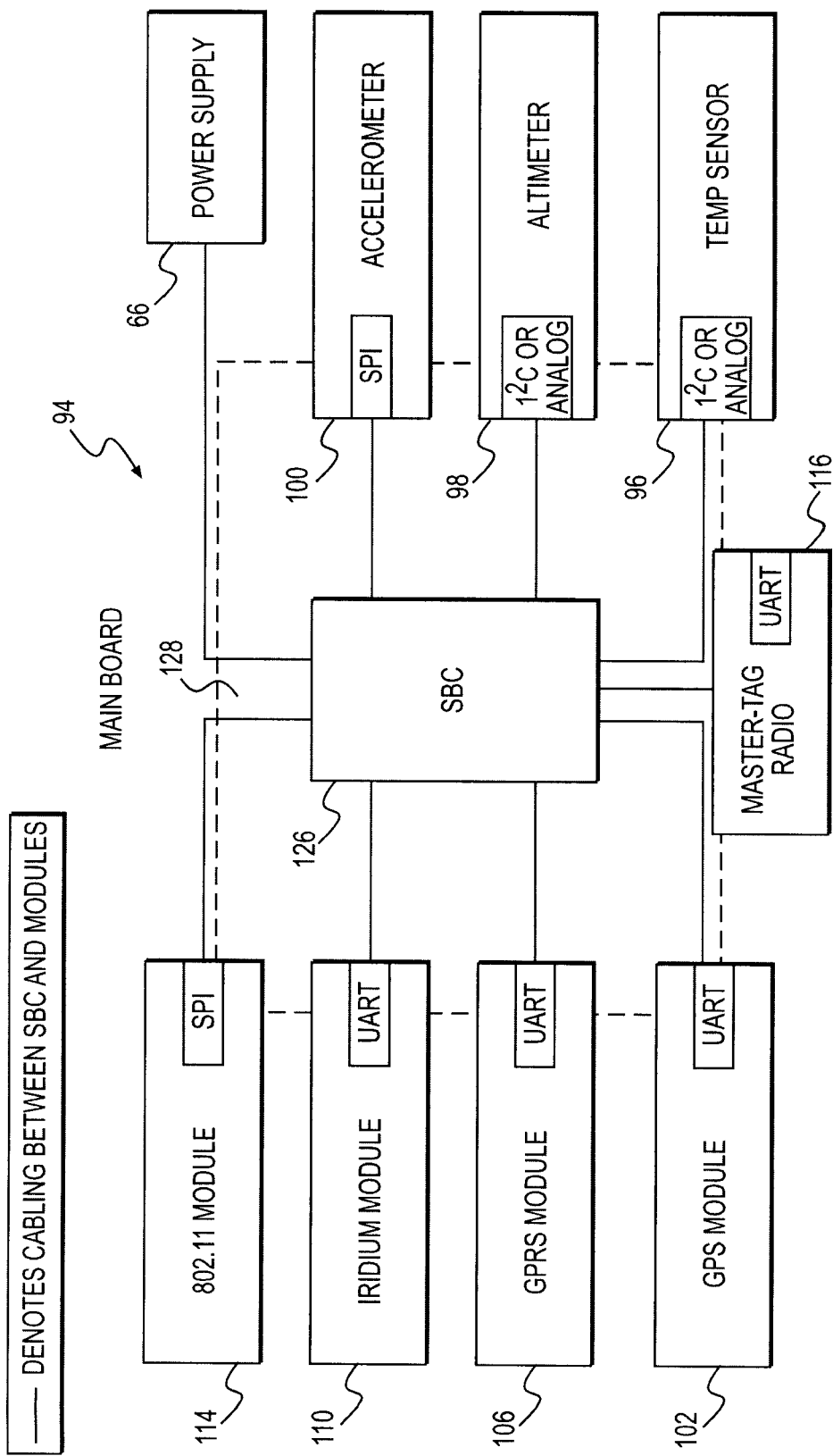
FIG. 12 is a block diagram illustrating the design of the master unit illustrated in FIG. 2.
Figure 13:
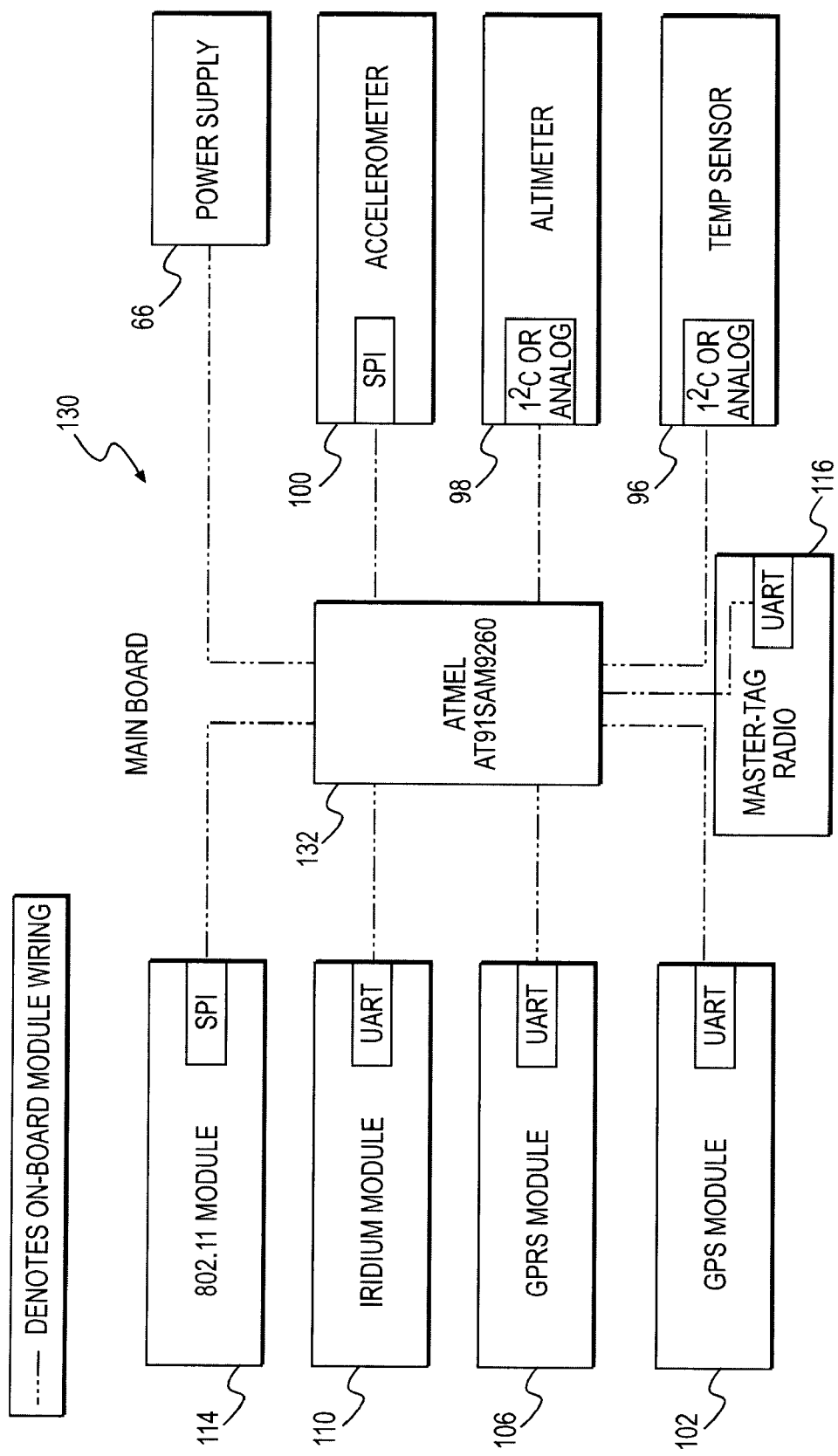
FIG. 13 is a block diagram illustrating an alternative contemplated embodiment of the master unit that forms a part of the tracking system of the invention.
Figure 14:
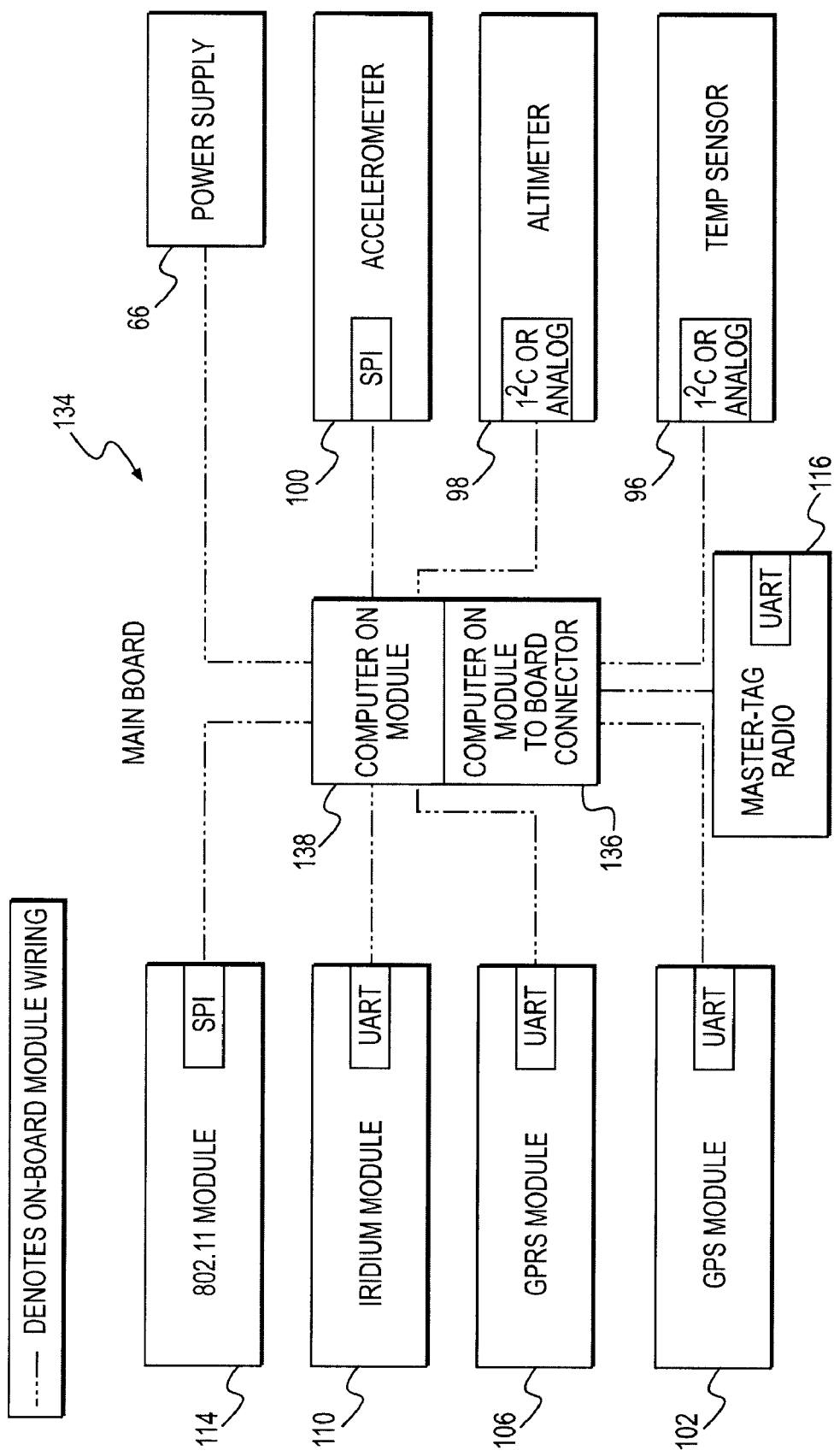
FIG. 14 is a block diagram illustrating another variation of the master unit that forms a part of the tracking system of the invention.

FIGS. 12-14 provide three alternative approaches to the design of the master controller. FIG. 12 illustrates a master controller based on an SBC. This is the same design provided in FIG. 2. FIG. 13 illustrates a microcontroller approach to the design of the master unit. FIG. 14 offers a computer on module approach to the master unit. Each of these three approaches will now be discussed.

FIG. 12 is a block diagram outlining the design of the master unit 20, which is illustrated in great detail in FIG. 2. The master unit 20 is based on an SBC approach, as discussed above. In this approach, the SBC includes two parts: (1) a processor board, which contains all of the functionality of the serial interfaces (i.e., UART, SBI, USB, etc.), and (2) a carrier board, which brings connectors to the periphery of the processor board. These connectors include, but are not limited to, USB, VGA, Ethernet, PS/2, and others.

FIG. 13 is a block diagram outlining the design of a master unit 130 using a microcontroller-based architecture. In this design, a printed circuit board contains all of the peripheral modules and a host microcontroller 132. It is contemplated that the microcontroller may be provided by Atmel (Atmel Corporation, 2325 Orchard Parkway, San Jose, Calif. 95131, USA) under the product descriptor AT91SAM9260. Of course, any other microcontroller may be employed without departing from the scope of the invention. The microcontroller 132 communicates with the sensors and the communication modules and includes memory for data storage. Flash and SDRAM memories may be provided, as would be appreciated by those skilled in the art.

FIG. 14 is a block diagram that illustrates the third contemplated embodiment for the master unit 134. This embodiment is based on a Computer-on-Module ("CoM") architecture. In this approach, the master unit 134 includes a board connector 136 and a CoM board 138. In this embodiment, cabling between the CoM and the peripherals may be largely eliminated, unlike in the master unit 20 based on the SBC.

Figure 15:
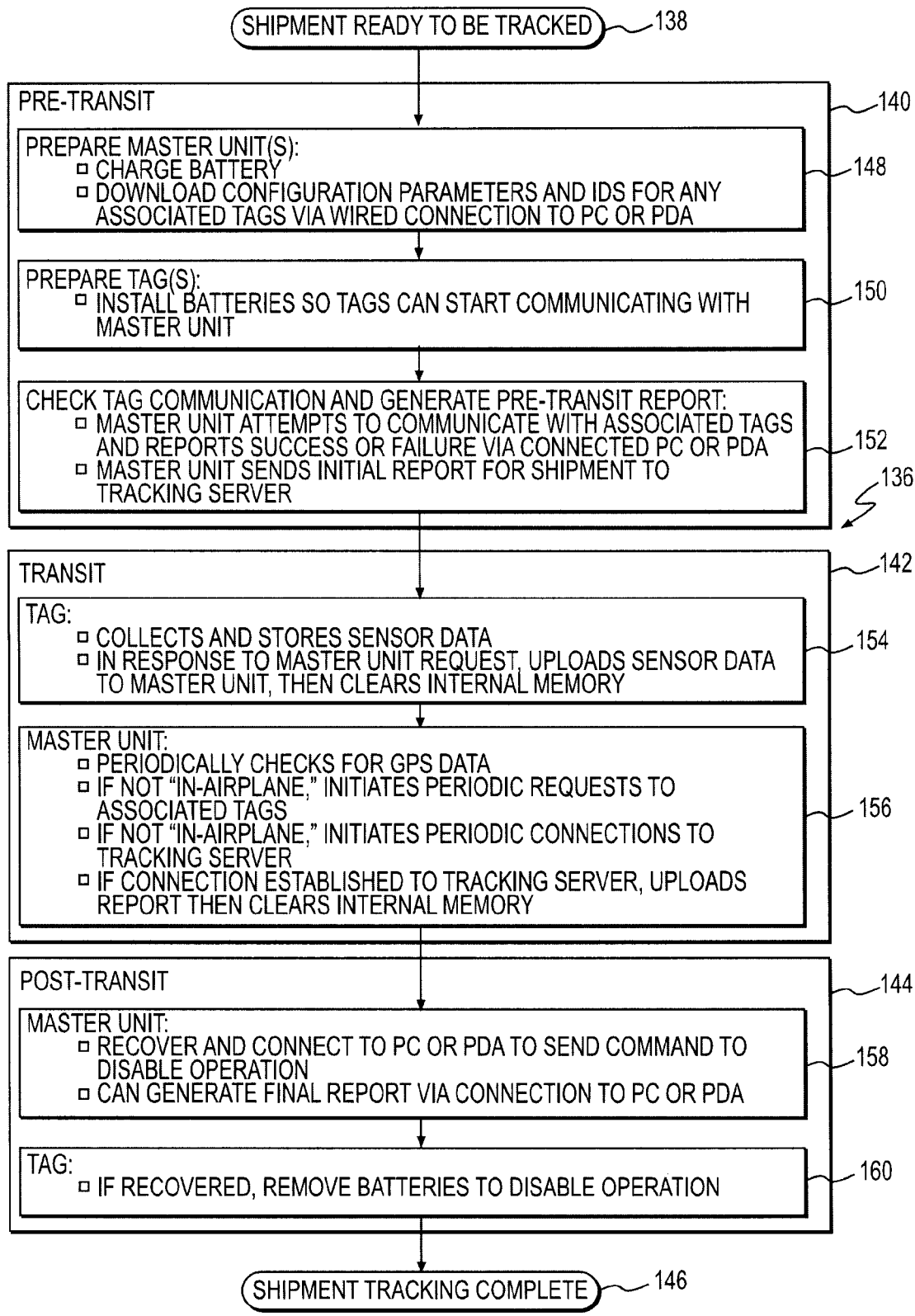
FIG. 15 is a flow chart illustrating one contemplated method associated with operation of the tracking system of the invention.

FIG. 15 provides a high-level flow chart outlining one contemplated method associated with the operation of the tracking system 10 of the invention. The tracking method 136 begins at 138 and includes three primary sections, a pre-transit portion 140, a transit portion 142, and a post-transit portion 144. The method ends at 146.

The pre-transit portion 140 of the tracking method 136 includes three sub-portions: (1) the master units 20 are prepared at 148, (2) the tags 16 are prepared at 150, and (3) the tags 16 are checked at 152.

Referring to 148, the master units 20 are prepared in the pre-transit portion 140 by charging the batteries 64 and downloading configuration parameters and IDs for the associated tags 16 via the external processor 78. Concerning the configuration parameters, it is noted that the master unit 20 may be configured for each shipment. For example, some shipments may include collection of humidity information while others do not. As a result, the master units 20 for each of these shipments may be configured differently for each of the shipments. In the alternative, both shipments may be configured in the same manner. At the conclusion of the shipment where humidity information is not required, the information may be deleted altogether.

At 150, the tags 16 are prepared for shipment. To prepare the tags 16, batteries are installed in the battery compartment 36 to assure that the tags 16 have a sufficiently large charge to operate for the entire duration of the shipment. Once the batteries are installed, the tags 16 may initiate communication with the master unit 20. Since the configuration parameters have been loaded into the master unit 20 at 148, relevant instructions may be forwarded to the tags 16 from the master unit 20.

At 152, tag communications are checked and a pre-transit report is generated. Once the tags 16 become active, the master unit 20 will communicate with each of the tags to assure that a communication link 18 may be established between them. If all of the communication links 18 are successful, then the master unit 20 and the tags 16 may proceed to the transit portion 142 of the method 136.

The transit portion 142 of the method 136 includes two sub-parts: (1) a tag operational portion 154, and (2) a master unit operational portion 156. The tag operational portion 154 involves two operations. First, the tag 16 collects and stores sensor data. Second, the tag uploads information to the master unit 20 upon receiving a request from the master unit 20 to do so. After uploading information to the master unit 20, the tag 16 will clear its internal memory so that there is sufficient space for additional data. The master unit operational portion 156 includes four operations. First, the master unit 20 checks for GPS data when the master unit 20 is not on board an aircraft. If the master unit 20 is on board an aircraft, the master unit 20 will have already provided notice to the central processor 34 or the tracking server so that the tracking system 10 will track the aircraft beacon rather than searching for signals from the master unit 20. The master unit 20 will initiate periodic requests for shipping information from the associated tags 16. As noted above, the tags 16 provide the shipping information in response to such a request. This request is made if the master unit 20 and the tags 16 are not on board an aircraft. If the master unit 20 and the tags 16 are on board an aircraft, this function is disabled until after the aircraft lands. Third, the master unit 20 will initiate periodic contact with the central processor 34 or the tracking server if the master unit 20 is not on board an aircraft. If the master unit 20 is on board an aircraft, the master unit 20 will disable this function until after the aircraft lands. Fourth, in connection with initiating contact with the central processor 34 or tracking server, the master unit will upload shipping information from its memory to the central processor 34, thereby clearing memory space for additional shipping information.

The post-transit portion 144 of the method 136 includes two sub-parts: (1) a master unit shut-down phase 158, and (2) a tag shut-down phase 160. In the master unit shut-down phase 158, the master unit 20 is recovered from the group of parcels 14 and is connected to the external processor 78. The external processor 78 may recover any additional information from the master unit 20 that was not previously transmitted to the central processor 34. In addition, the external processor 78 may provide instructions for the master unit 20 to cease operation. In addition, the external processor 78 may execute a diagnostic program to analyze the current condition of the master unit 20 and provide a report. The report may indicate, for example, if the master unit 20 is functional and ready for a subsequent shipment. Concerning the tag shout-down phase 160, the tag 16 is recovered from the parcels 14 and the batteries are removed so that the tag 16 ceases operation.

Figure 16:
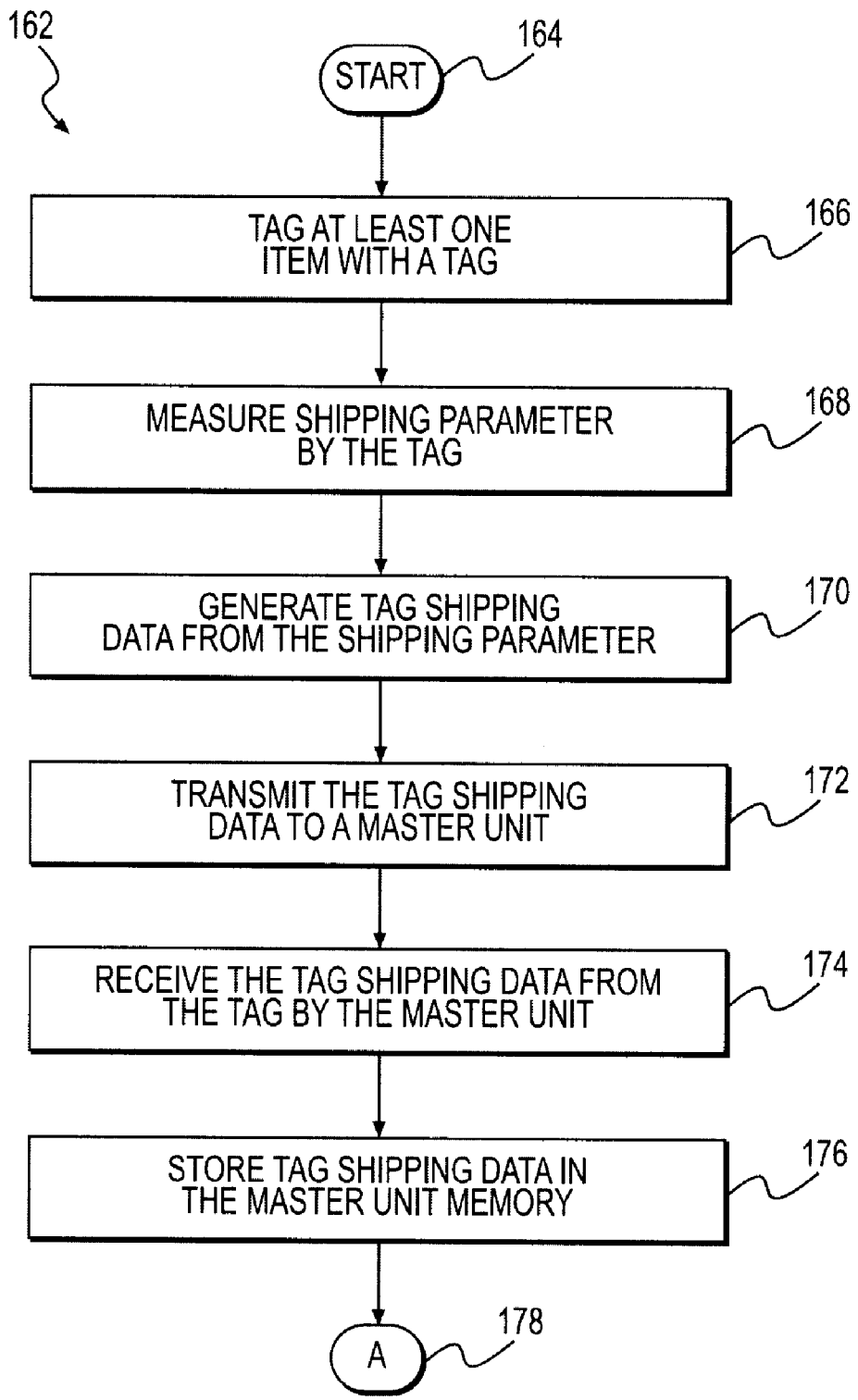
FIG. 16 is a first part of a flow chart illustrating another method contemplated for use in association, with the tracking system of the invention.

Reference is now made to FIG. 16, which provides a flow diagram for a method of operation of the invention.

The method 162 begins at 164. At 166, the method 162 includes tagging at least one item, such as a parcel 14, with a tag 16. At 168, a shipping parameter is measured by the tag 16 for the parcel 14. At 170, the tag 16 generates tag shipping data based upon the shipping parameter. At 172, the tag 16 transmits the tag shipping data to the master unit 20. At 174, the master unit 20 receives the tag shipping data from the tag 16. At 176, the master unit 20 stores the tag shipping data in memory associated with the master unit 20. Reference number 178 indicates that the method 162 continued to FIG. 17.

Figure 17:
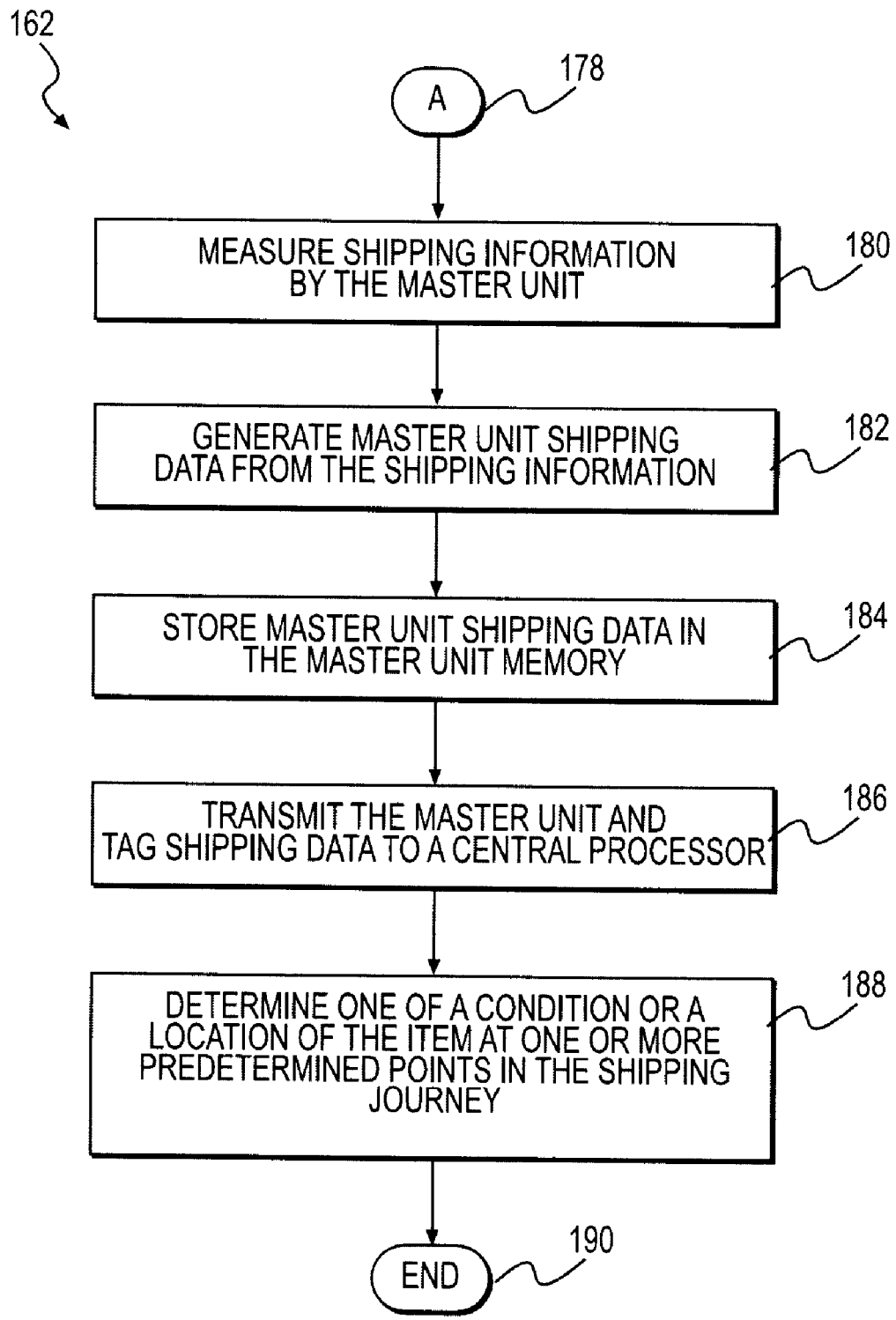
FIG. 17 is the second part of a flow chart illustrating another method contemplated for use in association, with the tracking system of the invention.

With reference to FIG. 17, the method 162 continues at 180, where the master unit 20 measures shipping information. The master unit 20 then generates master unit shipping data that is also stored in the memory of the master unit together with the tag shipping data at 184. Periodically, the master unit transmits the shipping data to the central processor 34, which step is identified at 186. From the shipping data, the central processor 34 determines wither a location of the parcel 14 or a condition of the parcel 14. This may be repeated at several points during the shipping journey.

As may be appreciated from the foregoing, the master unit 20 also receives GPS data via the GPS receiver 102. The data from the GPS receiver 102 becomes a part of the master unit shipping data that is transmitted to the central processor 34. This data permits the central processor to determine, in real time, the location of the parcels 14.

For the invention, it is contemplated that the central processor 34 will calculate the location of the master unit 20 and the tags 16 (and associated parcels 14) based on one or more of the various inputs discussed above. While this functionality is contemplated to be dedicated to the central processor 34, the master unit 16 also may include this functionality.

The central processor 34 is contemplated to be connected with the Internet. As a result, the central processor 34 may be accessed by a shipper and/or a recipient to track the location of the parcels 14 during shipment. Since the master unit 20 provides periodic shipping information during transit, the central processor 34 may provide this information to the shipper and/or the recipient. As a result, it is possible for the shipper and/or the recipient to locate one or more parcels 14 at any point during transit from the shipping origin to the destination.

As noted above, those skilled in the art should readily appreciate that there are equivalents and variations of the embodiments discussed above that may be practiced while remaining within the scope of the instant invention. Those equivalents and embodiments are intended to be encompassed hereby.

What is claimed is:

1. A system for tracking a location of at least one item, comprising:

a tag being shipped with the at least one item during a shipping journey from a point of origin to a destination, wherein the tag comprises a tag sensor to sense at least one shipping parameter during the shipping journey and to generate tag shipping data at least for a portion of the shipping journey, a tag memory in communication with the tag sensor to store the tag shipping data, a tag radio in communication with the tag memory to transmit the tag shipping data, wherein tag radio wireless communication is disabled when the at least one item is disposed on an aircraft, a tag microcontroller to coordinate operation between the tag sensor, the tag memory, and the tag radio, and a tag power source to provide power to the tag sensor, the tag memory, the tag radio, and the tag microcontroller;

a master unit being shipped with at least the tag, wherein the master unit comprises a master unit sensor to sense at least one shipping parameter during the shipping journey and to generate master unit shipping data at least for a portion of the shipping journey, a master unit memory in communication with the master unit sensor to store the master unit shipping information and also to store tag shipping information received from the tag, a master unit radio in communication with the master unit memory to communicate with the tag and also to receive the tag shipping data from the tag and provide the tag shipping information to the master unit memory, wherein master radio wireless communication is disabled when the at least one item is disposed on an aircraft, a master unit microcontroller to coordinate operation between the master unit sensor, the master unit memory, and the master unit radio, a master unit communication modem to transmit master unit shipping data and tag shipping data, and a master unit power source to provide power to the master unit sensor, the master unit memory, the master unit radio, the master unit microcontroller, and the master unit communication modem;

a central processor that receives shipping data from the master unit and determines at least one of a condition or location of the at least one item at one or more predetermined points during the shipping journey, and wherein the central processor automatically deactivates the master unit and tags based upon placement of the at least one item on board an aircraft and the central processor receives tracking information via the aircraft beacon rather than searching for signals from the master unit.

2. The apparatus of claim 1, wherein: the tag comprises a plurality of tags, each of which are associated with the at least one item during the shipping journey.

3. The apparatus of claim 1, wherein the tag sensor includes at least a humidity sensor, a temperature sensor, a shock sensor, and an accelerometer.

4. The apparatus of claim 1, wherein the master unit sensor includes at least a humidity sensor, a temperature sensor, and an accelerometer.

5. The apparatus of claim 1, wherein the master unit is positioned within a predetermined distance from the tag so that the tag radio and the master unit radio may communicate with one another during the shipping journey.

6. The apparatus of claim 5, wherein the tag radio and the master unit radio operate at a 2.4 GHz frequency.

7. The apparatus of claim 1, wherein the tag radio communicates with the master unit radio at repetitive temporal intervals.

8. The apparatus of claim 1, wherein the master unit radio communicates with the central processor at repetitive temporal intervals to communicate shipping data.

9. The apparatus of claim 1, wherein receipt of shipping data from the master unit to the central processor is disabled when the master unit is on board the aircraft.

10. The apparatus of claim 1, wherein the tag radio and the master unit radio are re-enabled when the tag accelerometer and the master unit accelerometer detect a deceleration indicative of a landing by the aircraft.

11. The apparatus of claim 1, wherein the master unit communication modem permits communication via at least one of a WiFi modem, a GPRS modem, or a satellite communications modem.

12. The apparatus of claim 11, wherein the master unit microcontroller selects one of the WiFi modem, GPRS modem, or satellite communications modem based at least on comparative cost therebetween.

13. The apparatus of claim 12, wherein the WiFi modem is preferred to communication via the GPRS modem, which is, in turn, preferred to communication via the satellite.

14. The apparatus of claim 1, wherein the master unit further comprises: a GPS modem for receiving GPS signals and providing GPS data to the master unit microcontroller.

15. The apparatus of claim 1, wherein the master unit communication modem permits communication via a communication link comprising at least one of a wired or wireless link, radio link, electromagnetic link, cellular network link, global positioning system ("GPS") link, Bluetooth link, personal area network ("PAN") link, and WiFi link.

16. The apparatus of claim 1, wherein the master unit communication modem permits communication via at least one of a WiFi network, a cellular network, or a satellite communications network.

17. The apparatus of claim 16, wherein the master unit microcontroller selects one of the WiFi network, cellular network, or satellite communications network based at least on a strength of signal available for each of the modems.

18. The apparatus of claim 17, wherein the master unit microcontroller selects one of the WiFi network, cellular network, or satellite communications network based at least on comparative cost therebetween.

19. The apparatus of claim 18, wherein the WiFi network is preferred to communication via the cellular network, which is, in turn, preferred to communication via the satellite communications network.

20. The apparatus of claim 1, wherein the tag unit memory also stores identifying information comprising at least one of content information, point of origin, destination information, name and contact information for a shipper, and name and contact information for a recipient.

21. The apparatus of claim 1, wherein the tag memory also stores identifying information comprising content information which includes invoice information.

22. The apparatus of claim 21, wherein the invoice information is accessible for inspection by customs officials.

23. The apparatus of claim 1, wherein the master unit memory stores identifying information comprising at least one of content information, point of origin, destination information, name and contact information for a shipper, and name and contact information for a recipient.

24. The apparatus of claim 1, wherein the master unit memory stores identifying information comprising content information which includes invoice information.

25. The apparatus of claim 24, wherein the invoice information is accessible for inspection by customs officials.

26. The apparatus of claim 1, wherein the master unit memory stores the tag shipping data and, thereby, acts as a flight recorder for the tag.

27. The apparatus of claim 1, wherein: the master unit further includes a battery charge circuit for receiving power from a transportation vehicle.

28. The apparatus of claim 1, wherein: the tag comprises an alarm that may be triggered when the parcel is removed from a designated area.

29. A method for tracking at least one item, comprising:
tagging the at least one item with a tag;
measuring at least one shipping parameter by the tag being shipped with the at least one item during a shipping journey;
generating tag shipping data based upon the at least one shipping parameter;
transmitting the tag shipping data from the tag to a master unit being shipped with the at least one item;
receiving the tag shipping data from the tag; storing the tag shipping data in memory of the master unit;
measuring the at least one shipping parameter by the master unit; generating master unit shipping data based upon the at least one shipping parameter;
storing the master unit shipping data in the master unit memory;
transmitting the master unit shipping data and the tag shipping data to a central processor;
the central processor automatically deactivating the master unit and tags based upon placement of the at least one item on board an aircraft and the central processor receiving tracking information via the aircraft beacon rather than searching for signals from the master unit;
disabling tag radio wireless communication when the at least one item is disposed on an aircraft; and
disabling master radio wireless communication when the at least one item is disposed on an aircraft;
determining at least one of a condition or a location of the at least one item at one or more predetermined points during the shipping journey.

30. The method of claim 29, further comprising:
receiving GPS information by the master unit; and
storing the GPS information as a part of the master unit shipping information.

31. The method of claim 29, further comprising:
disabling communication between the tag and the master unit and between the master unit and the central processor when the at least one item is in a location where the communication is prohibited.

32. The method of claim 29, wherein the tag transmits tag shipping data to the master unit at predetermined temporal intervals.

33. The method of claim 29, wherein the master unit transmits master unit shipping information and tag information to the central processor at predetermined temporal intervals.

34. The apparatus of claim 1, wherein the tag radio and the master unit radio communicate via a communication link comprising a local transmission link.

35. The apparatus of claim 34, wherein the local transmission link comprises at least one of a WiFi network, a generic wireless local area network ("WLAN"), a local area network ("LAN"), a Bluetooth connection, and a wireless personal area network ("PAN").

36. The method of claim 29, further comprising: evaluating, by the master unit, a comparative cost between a WiFi signal, a GPRS signal, and a satellite communication signal; and at least partially based on the comparative cost of the WiFi signal, the GPRS signal, and the satellite communication signal, selecting a WiFi channel, a GPRS channel, or a satellite communication channel with which to communicate with the central processor.

37. The method of claim 29, further comprising: providing, via the central processor, at least one of the tag shipping data and master unit shipping data to a user.

38. The method of claim 37, wherein at least one of the tag shipping data and master unit shipping data are provided to a user in real time.

39. The method of claim 29, further comprising: storing, via at least one of the tag memory and the master unit memory, identifying information comprising at least one of content information, point of origin, destination information, name and contact information for a shipper, and name and contact information for a recipient.

40. The method of claim 29, further comprising: storing, via the master unit memory, identifying information comprising content information which includes invoice information.

41. The apparatus of claim 40, wherein the invoice information is accessible for inspection by customs officials.

* * * * *